(12) United States Patent
Chen et al.

(10) Patent No.: US 9,756,627 B2
(45) Date of Patent: Sep. 5, 2017

(54) EPDCCH RESOURCE AND QUASI-CO-LOCATION MANAGEMENT IN LTE

(71) Applicant: QUALCOMM Incorporated, San Diego, CA (US)

(72) Inventors: Wanshi Chen, San Diego, CA (US); Stefan Geirhofer, Brooklyn, NY (US); Peter Gaal, San Diego, CA (US); Hao Xu, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/719,208

(22) Filed: May 21, 2015

(65) Prior Publication Data

US 2015/0257138 A1    Sep. 10, 2015

Related U.S. Application Data

(62) Division of application No. 14/021,980, filed on Sep. 9, 2013.

(Continued)

(51) Int. Cl.
*H04W 72/04* (2009.01)
*H04L 5/00* (2006.01)
(Continued)

(52) U.S. Cl.
CPC .......... *H04W 72/042* (2013.01); *H04B 7/024* (2013.01); *H04B 7/0626* (2013.01);
(Continued)

(58) Field of Classification Search
CPC ...................................... H04L 5/001
(Continued)

(56) References Cited

U.S. PATENT DOCUMENTS 8,842,628 B2   9/2014 Gao et al.
2007/0260956 A1   11/2007 Terry et al.
(Continued)

FOREIGN PATENT DOCUMENTS

CN    102215094 A    10/2011
CN    102291785 A    12/2011
(Continued)

OTHER PUBLICATIONS

CATT: "E-PDCCH starting symbol configuration", 3GPP Draft; R1-124103, 3rd Generation Partnership Project (3GPP), Mobile Competence Centre; 650, Route Des Lucioles; F-06921 Sophia-Antipolis Cedex; France vol. RAN WG1, No. San Diego, USA; Oct. 8, 2012-Oct. 12, 2012 Sep. 29, 2012 (Sep. 29, 2012), pp. 1, XP050662812, Retrieved from the Internet: URL: http://www.3gpp.org/ftp/tsg_ran/WG1_RL1/TSGR_70b/Docs/ [retrieved on Sep. 29, 2012] the whole document.

(Continued)

*Primary Examiner* — Rhonda Murphy
(74) *Attorney, Agent, or Firm* — Nerrie M. Zohn

(57) ABSTRACT

A method, an apparatus, and a computer program product for wireless communication are provided. In an aspect, the apparatus may determine whether a starting symbol of an enhanced physical downlink control channel (EPDCCH) is an initial symbol in a subframe based on an EPDCCH configuration. Based on the determination, the apparatus may refrain from decoding a subset of legacy control channels in the subframe when the starting symbol of the EPDCCH is the initial symbol in the subframe. The legacy control channel may comprise at least one of a physical control format indicator channel (PCFICH), a physical hybrid-ARQ indicator channel (PHICH), or a combination thereof.

20 Claims, 18 Drawing Sheets

Related U.S. Application Data

(60) Provisional application No. 61/722,097, filed on Nov. 2, 2012.

(51) Int. Cl.
*H04B 7/024* (2017.01)
*H04B 7/06* (2006.01)
*H04L 1/18* (2006.01)
*H04L 25/02* (2006.01)

(52) U.S. Cl.
CPC .......... *H04L 1/1812* (2013.01); *H04L 5/0035* (2013.01); *H04L 5/0048* (2013.01); *H04L 5/0053* (2013.01); *H04L 5/001* (2013.01); *H04L 25/0204* (2013.01)

(58) Field of Classification Search
USPC ........................................................ 370/329
See application file for complete search history.

(56) References Cited

U.S. PATENT DOCUMENTS

| | | | |
|---|---|---|---|
| 2011/0170496 | A1 | 7/2011 | Fong et al. |
| 2011/0269442 | A1* | 11/2011 | Han .................... H04W 72/082 455/418 |
| 2011/0269492 | A1 | 11/2011 | Wang |
| 2011/0317657 | A1 | 12/2011 | Chmiel et al. |
| 2012/0106465 | A1 | 5/2012 | Haghighat et al. |
| 2012/0201216 | A1 | 8/2012 | Wu |
| 2012/0207126 | A1 | 8/2012 | Qu et al. |
| 2012/0218969 | A1 | 8/2012 | Tan |
| 2012/0250523 | A1 | 10/2012 | Miki |
| 2012/0275400 | A1 | 11/2012 | Chen et al. |
| 2012/0320846 | A1 | 12/2012 | Papasakellariou et al. |
| 2013/0114431 | A1 | 5/2013 | Koivisto |
| 2013/0250864 | A1 | 9/2013 | Zhang et al. |
| 2013/0294369 | A1* | 11/2013 | Dinan .................... H04L 5/001 370/329 |
| 2013/0343299 | A1 | 12/2013 | Sayana et al. |
| 2014/0071935 | A1 | 3/2014 | Papasakellariou et al. |
| 2014/0078978 | A1 | 3/2014 | Cheng et al. |
| 2014/0119266 | A1 | 5/2014 | Ng et al. |
| 2014/0126490 | A1 | 5/2014 | Chen et al. |
| 2014/0126496 | A1 | 5/2014 | Sayana et al. |
| 2015/0257137 | A1 | 9/2015 | Chen et al. |
| 2015/0257139 | A1 | 9/2015 | Chen et al. |

FOREIGN PATENT DOCUMENTS

| | | |
|---|---|---|
| CN | 102316595 A | 1/2012 |
| CN | 102355732 A | 2/2012 |
| CN | 102395206 A | 3/2012 |
| WO | 2011085195 A1 | 7/2011 |
| WO | 2012109542 A1 | 8/2012 |

OTHER PUBLICATIONS

International Search Report and Writen Opinion—PCT/US2013/059079—ISA/EPO—dated Apr. 17, 2014.
LG Electronics: "Principles of EPDCCH starting symbol configuration", 3GPP Draft; R1-124323, 3rd Generation Partnership Project (3GPP) , Mobile Competence Centre ; 650, Route Deslucioles; F-06921 Sophia-Antipolis Cedex ; France vol. RAN WG1, No. San Diego, USA; Oct. 8, 2012-Oct. 12, 2012, Sep. 29, 2012 (Sep. 29, 2012), XP050662221, pp. 1-4.
LG Electronics: "Remaining details on EPDCCH resource configuration," 3GPP Draft; R1-124983, EPDCCH Resource Configuration, 3rd Generation Partnership Project (3GPP), Mobile Competence Centre , 650 Route Des Luc Ioles ; F-06921 Sophia-Antipolis Cedex ; France vol. RAN WG1, No. New Orleans, USA; Nov. 12, 2012-Nov. 16, 2012 Nov. 3, 2012 (Nov. 3, 2012), XP050662899, pp. 1-4.
Nokia et al., "Remaining details on search spaces of EPDCCH", 3GPP Draft; R1-124184, 3rd Generation Partnership Project (3GPP), Mobile Competence Centre; 650, Route Des Lucioles ; F-06921 Sophia Antipolis Cedex; France, vol. RAN WG1 , No. San Diego, USA; Oct. 8, 2012-Oct. 12, 2012, Sep. 29, 2012 (Sep. 29, 2012), pp. 1-12, XP050662093, Retrieved from the Internet: URL:http ://www.3gpp.org/ftp/tsg_ran/WG1_RL 1/TSGR1_70b/ Docs/ [retrieved on Sep. 29, 2012].
Partial International Search Report—PCT/US2013/059079—ISA/EPO—dated Feb. 27, 2014.
Qualcomm Incorporated: "Remaining details of EPDCCH Starting Symbol Configuration", 3GPP Draft; R1-125108 Remaining Details of EPDCCH Starting Symbol Configuration, 3rd Generation Partnership Project (3GPP), Mobile Competence Centre, vol. RAN WG1, No. New Orleans, USA; Nov. 12, 2012-Nov. 16, 2012 Nov. 3, 2012 (Nov. 3, 2012), pp. 1-3, XP050662969, Retrieved from the Internet: URL:http://www.3gpp.org/ftp/tsg_ran/WG1_RL1/TSGR1_71/Docs/ [retrieved on Nov. 3, 2012]the whole document.
Renesas Mobile Europe LTD: "Details of CRS rate matching and quasi-colocation signaling", 3GPP Draft; R1-124392, 3rd Generation Partnership Project (3GPP), Mobile Competence Centre ; 650, Route Deslucioles ; F-06921 Sophia-Antipolis Cedex; France vol. RAN WG1, No. San Diego, USA; Oct. 8, 2012-Oct. 12, 2012, Sep. 29, 2012 (Sep. 29, 2012), XP050662288, pp. 1-4.
Samsung: "Design Aspects for EPDCCH Sets", 3GPP Draft; R1-124376 EPDCCH Sets, 3rd Generation Partnership Project (3GPP), Mobile Competence Centre; 650 Route Deslucioles; F-06921 Sophia-Antipolis Cedex; France vol. RAN WG1, No. San Diego, USA; Oct. 8, 2012-Oct. 12, 2012, Sep. 29, 2012 (Sep. 29, 2012), XP050662272, pp. 1-6.
Second Written Opinion from International Application No. PCT/US2013/059079, dated Nov. 11, 2014, 28 Pages.
Alcatel-Lucent, Alcatel-Lucent Shanghai Bell: "Remaining Details of Downlink Control Signalling for CoMP," 3GPP TSG-RAN WG1#70b R1-124408, 3GPP, Sep. 29, 2012, 6 pages.
Alcatel-Lucent, Alcatel-Lucent Shanghai Bell: "The Start Symbol Configuration for EPDCCH/PDSCH," 3GPP TSG-RAN WG1#70b R1-124419, 3GPP, Sep. 29, 2012, 2 pages.
Alcatel-Lucent (Rapporteur): "Updated RRC Parameters for EPDCCH," 3GPP TSG-RAN WG1#70b R1-124671, 3GPP, Oct. 12, 2012, 5 pages.
New Postcom:"Configuration of the Starting Symbol for EPDCCH," 3GPP TS G-RAN WG1#70b R1-124227, 3GPP, Sep. 29, 2012, 2 pages.
Qualcomm Incorporated: "Remaining details of EPDCCH Starting Symbol Configuration", 3GPP Draft; R1-125108 Remaining Details of EPDCCH Starting Symbol Configuration, 3rd Generation Partnership Project (3GPP), Mobile Competence Centre, vol. RAN WG1, No. New Orleans, USA; Nov. 12, 2012-Nov. 16, 2012, Nov. 3, 2012 (Nov. 3, 2012, pp. 1-3, XP050662969,Retrieved from the Internet: URL:http://www.3gpp.org/ftp/tsg_ran/WG1_RL 1 /TSGR1 _71 /Docs/[retrieved Nov. 3, 2012] the whole document.
Zte et al., "Way Forward on downlink control signalling for PDSCH RE mapping and quasi-co-location of CSI-RS and DMRS for TM10", 3GPP Draft; R1-124623, 3rd Generation Partnership Project (3GPP), Mobile Competence Centrel vol. RAN WG1, No. San Diego, USA; Oct. 8, 2012-Oct. 12, 2012 Oct. 12, 2012 (Oct. 12, 2012), pp. 1-4, XP050662485, Retrieved from the Internet: URL: http://www.3gpp.org/ftp/tsg_ran/WG1_RL1/TSGR1_70b/ Docs [retrieved on Oct. 12, 2012] the whole document.

\* cited by examiner

EPDCCH RESOURCE AND QUASI-CO-LOCATION MANAGEMENT IN LTE

CROSS-REFERENCE TO RELATED APPLICATIONS

This application is a divisional of U.S. patent application Ser. No. 14/021,980 entitled "EPDCCH RESOURCE AND QUASI-CO-LOCATION MANAGEMENT IN LTE" and filed on Sep. 9, 2013 and U.S. Provisional Application Ser. No. 61/722,097 entitled "EPDCCH RESOURCE AND QUASI-CO-LOCATION MANAGEMENT IN LTE" and filed on Nov. 2, 2012, each of which is expressly incorporated by reference herein in its entirety.

BACKGROUND

Field

The present disclosure relates generally to communication systems, and more particularly, to systems that employ coordinated multipoint wireless transmissions.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

In an aspect of the disclosure, a method, a computer program product, and an apparatus are provided. In an aspect, the apparatus may receive a set of configurations for an enhanced physical downlink control channel (EPDCCH) that are tied to a set of configurations received for a physical downlink shared channel (PDSCH). Each configuration in the set of configurations for the PDSCH may define at least one of a starting symbol, rate-matching information, or a quasi-co-location (QCL) indication and the set of configurations for the EPDCCH may be a subset from among the set of configurations for the PDSCH. The apparatus may then receive and process the EPDCCH based on at least one configuration from the set of configurations for the EPDCCH.

In an aspect, the apparatus may determine at least a first resource set and a second resource set configured for a control channel and may determine a common set of aggregation levels for the first resource set and second resource set. The apparatus may determine first rate-matching parameters for the first resource set and second rate-matching parameters for the second resource set and may process the control channel using at least the common set of aggregation levels and the first rate-matching parameters and second rate-matching parameters.

In an aspect, the apparatus may determine whether a starting symbol of an EPDCCH is an initial symbol in a subframe and may refrain from decoding a subset of legacy control channels in the subframe when the starting symbol of the EPDCCH is the initial symbol in the subframe.

DETAILED DESCRIPTION

Figure 1:
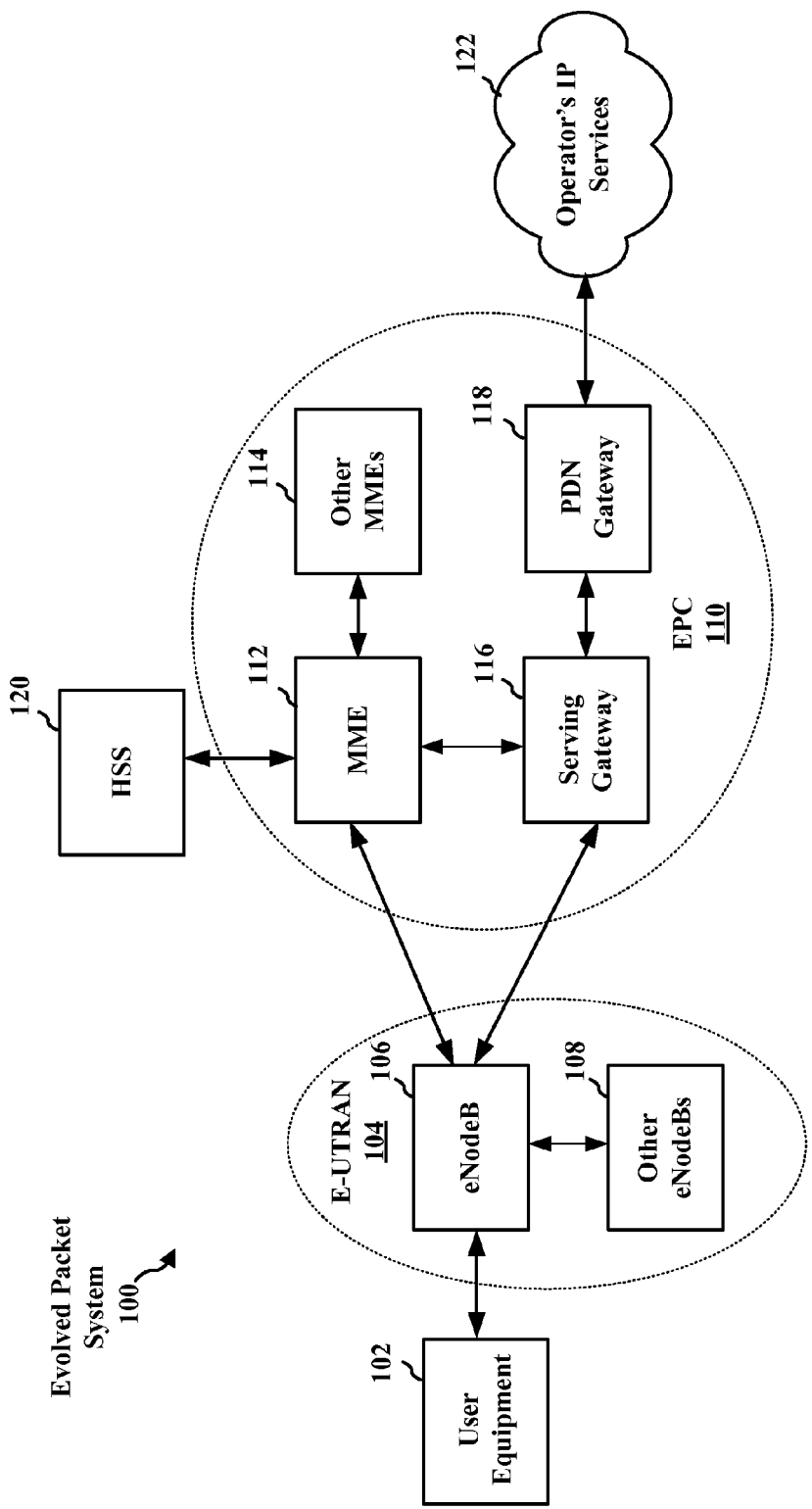
FIG. 1 is a diagram illustrating an example of a network architecture.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Combinations of the above should also be included within the scope of computer-readable media.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, a Home Subscriber Server (HSS) 120, and an Operator's IP Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108. The eNB 106 provides user and control planes protocol terminations toward the UE 102. The eNB 106 may be connected to the other eNBs 108 via a backhaul (e.g., an X2 interface). The eNB 106 may also be referred to as a base station, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected to the EPC 110 (e.g., by an S1 interface). The EPC 110 includes a Mobility Management Entity (MME) 112, other MMEs 114, a Serving Gateway 116, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include the Internet, an intranet, an IP Multimedia Subsystem (IMS), and a Packet-Switched Streaming Service (PSS).

Figure 2:
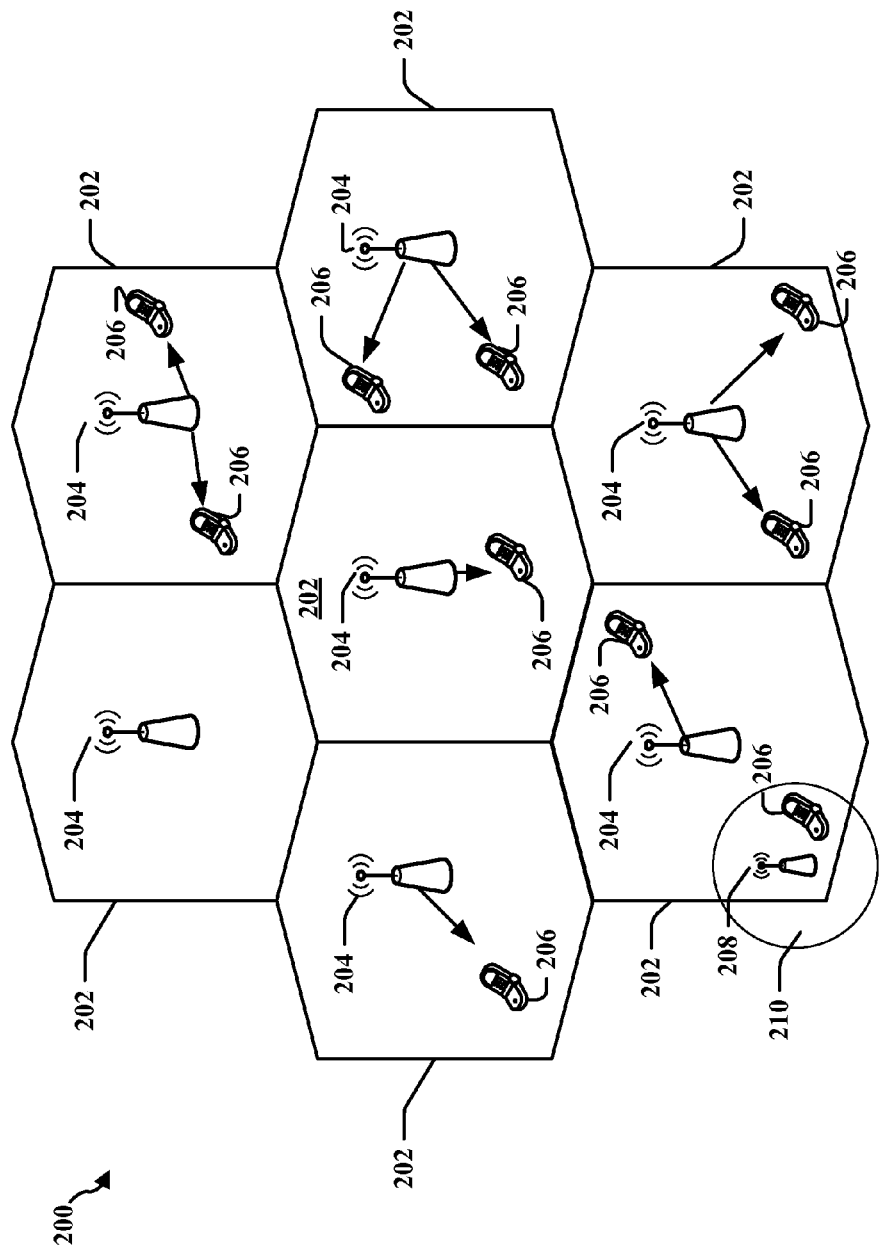
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. The lower power class eNB 208 may be a femto cell (e.g., home eNB (HeNB)), pico cell, micro cell, or remote radio head (RRH). The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116.

The modulation and multiple access scheme employed by the access network 200 may vary depending on the particular telecommunications standard being deployed. In LTE applications, OFDM is used on the DL and SC-FDMA is used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (Wi-MAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data steams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
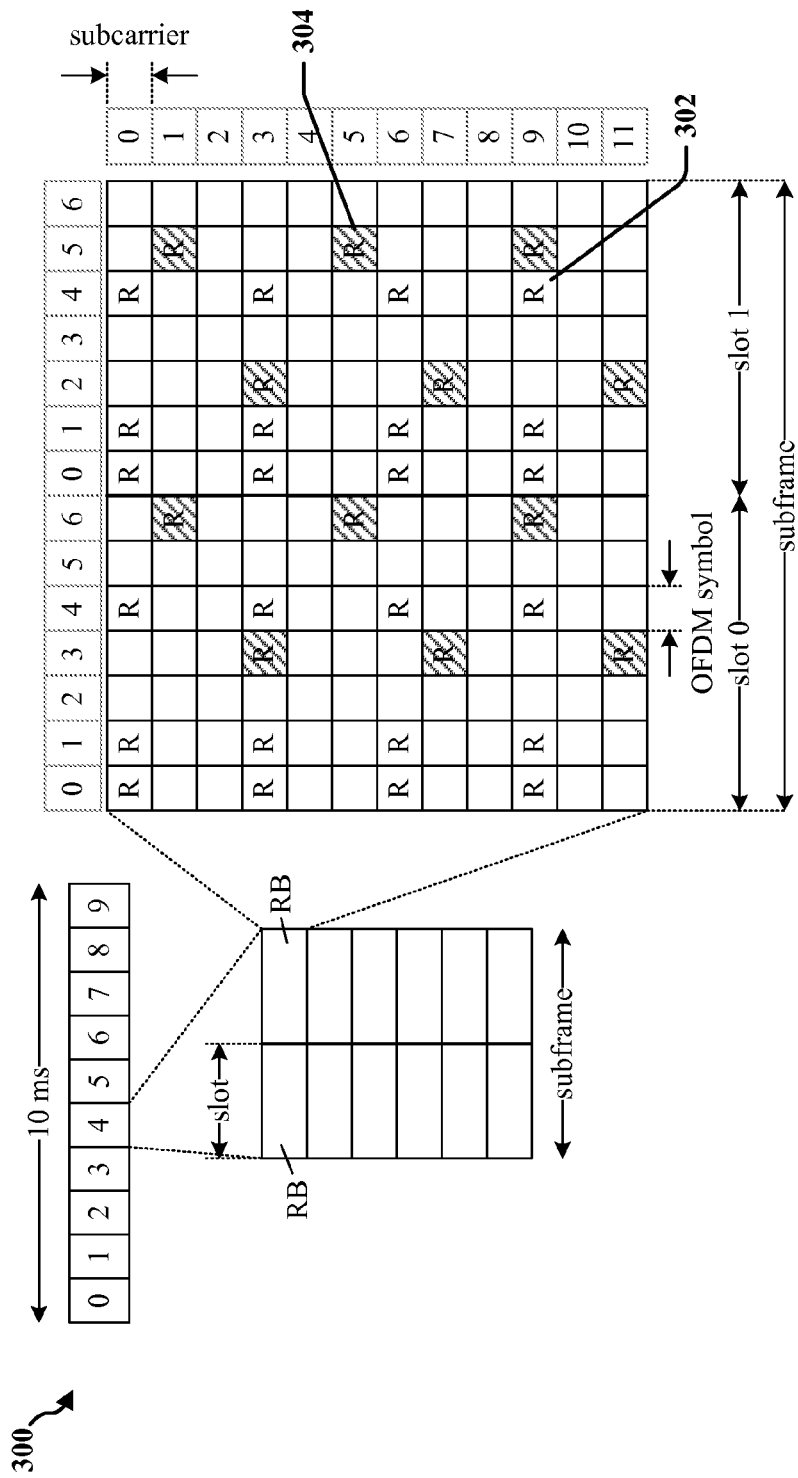
FIG. 3 is a diagram illustrating an example of a DL frame structure in LTE.

FIG. 3 is a diagram 300 illustrating an example of a DL frame structure in LTE. A frame (10 ms) may be divided into 10 equally sized sub-frames. Each sub-frame may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, for a total of 84 resource elements. For an extended cyclic prefix, a resource block contains 6 consecutive OFDM symbols in the time domain and has a total of 72 resource elements. Some of the resource elements, indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

Figure 4:
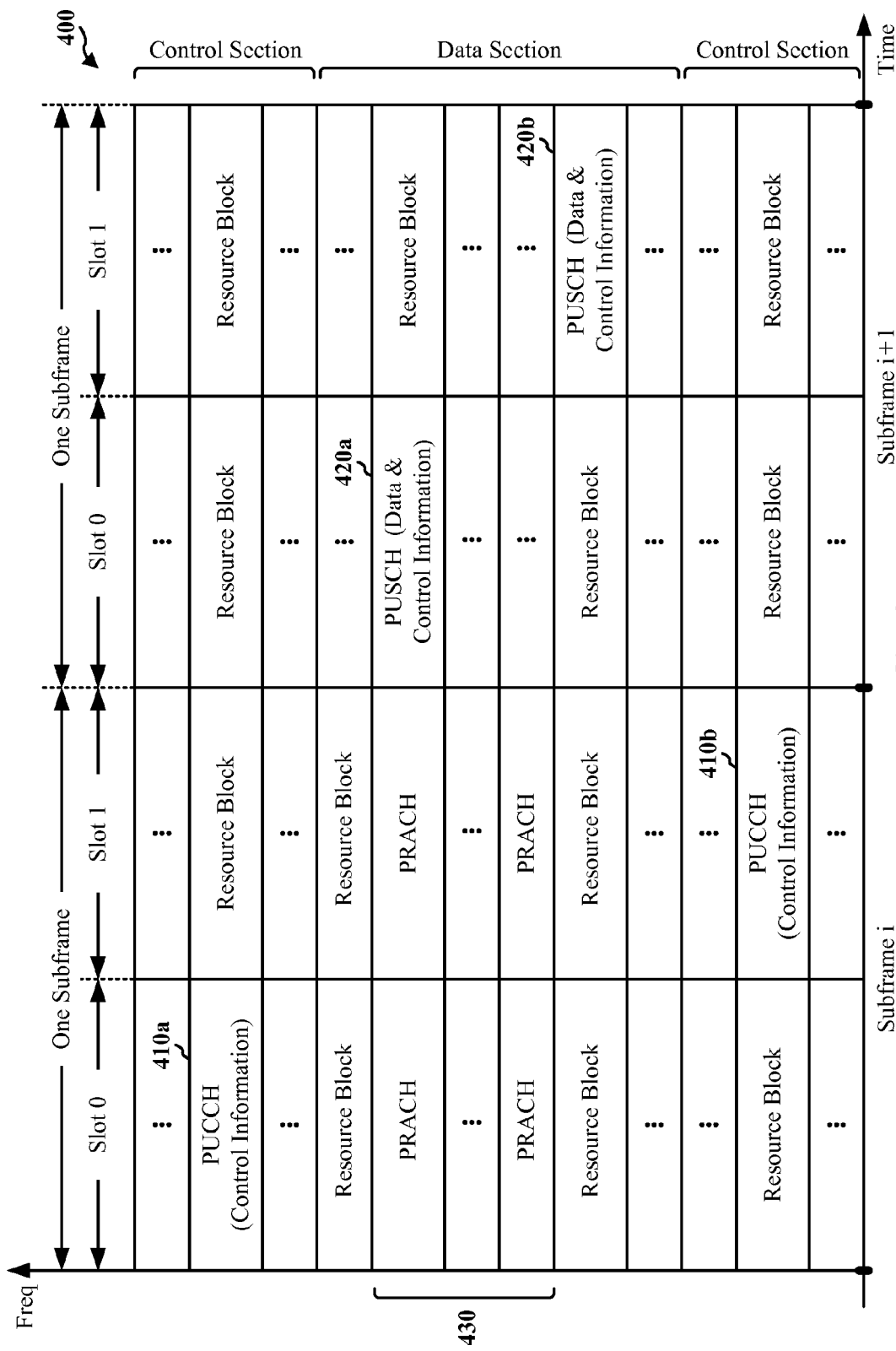
FIG. 4 is a diagram illustrating an example of an UL frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
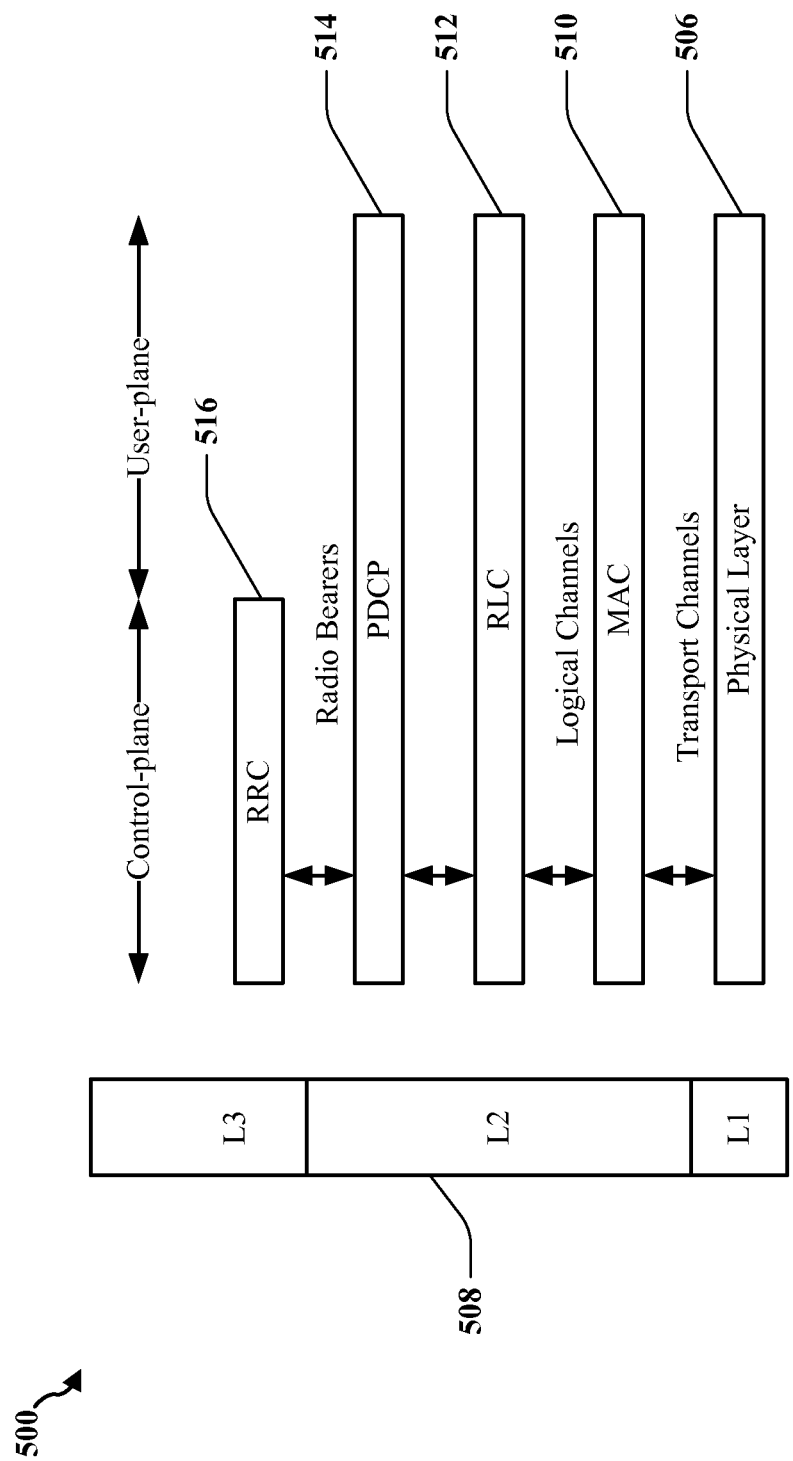
FIG. 5 is a diagram illustrating an example of a radio protocol architecture for the user and control planes.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC)

sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (i.e., radio bearers) and for configuring the lower layers using RRC signaling between the eNB and the UE.

Figure 6:
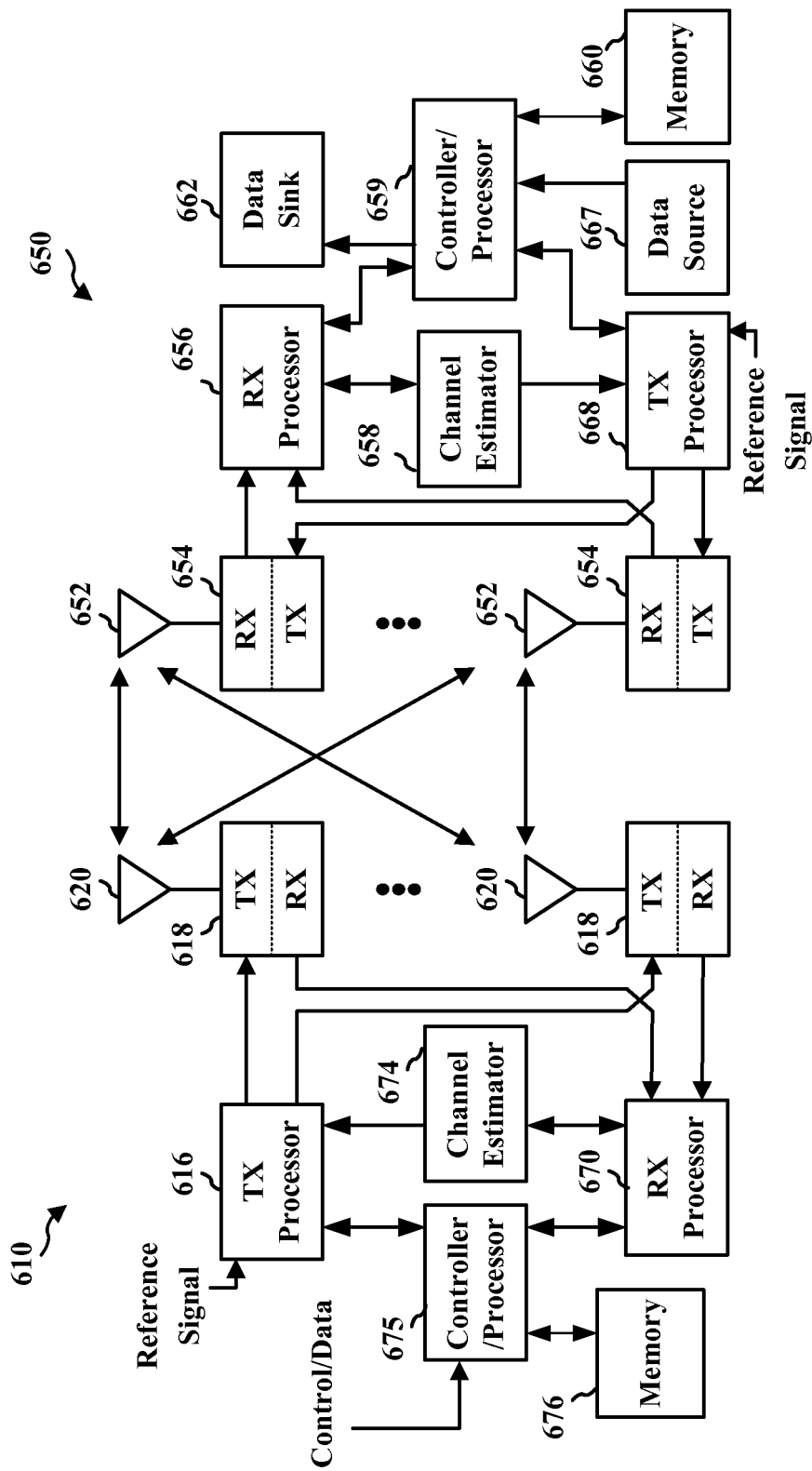
FIG. 6 is a diagram illustrating an example of an evolved Node B and user equipment in an access network.

FIG. 6 is a block diagram of an eNB 610 in communication with a UE 650 in an access network. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The transmit (TX) processor 616 implements various signal processing functions for the L1 layer (i.e., physical layer). The signal processing functions include coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream is then provided to a different antenna 620 via a separate transmitter 618TX. Each transmitter 618TX modulates an RF carrier with a respective spatial stream for transmission.

At the UE 650, each receiver 654RX receives a signal through its respective antenna 652. Each receiver 654RX recovers information modulated onto an RF carrier and provides the information to the receive (RX) processor 656. The RX processor 656 implements various signal processing functions of the L1 layer. The RX processor 656 performs spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each sub-carrier of the OFDM signal. The symbols on each subcarrier, and the reference signal, are recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 are provided to different antenna 652 via separate transmitters 654TX. Each transmitter 654TX modulates an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the control/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

Figure 7:
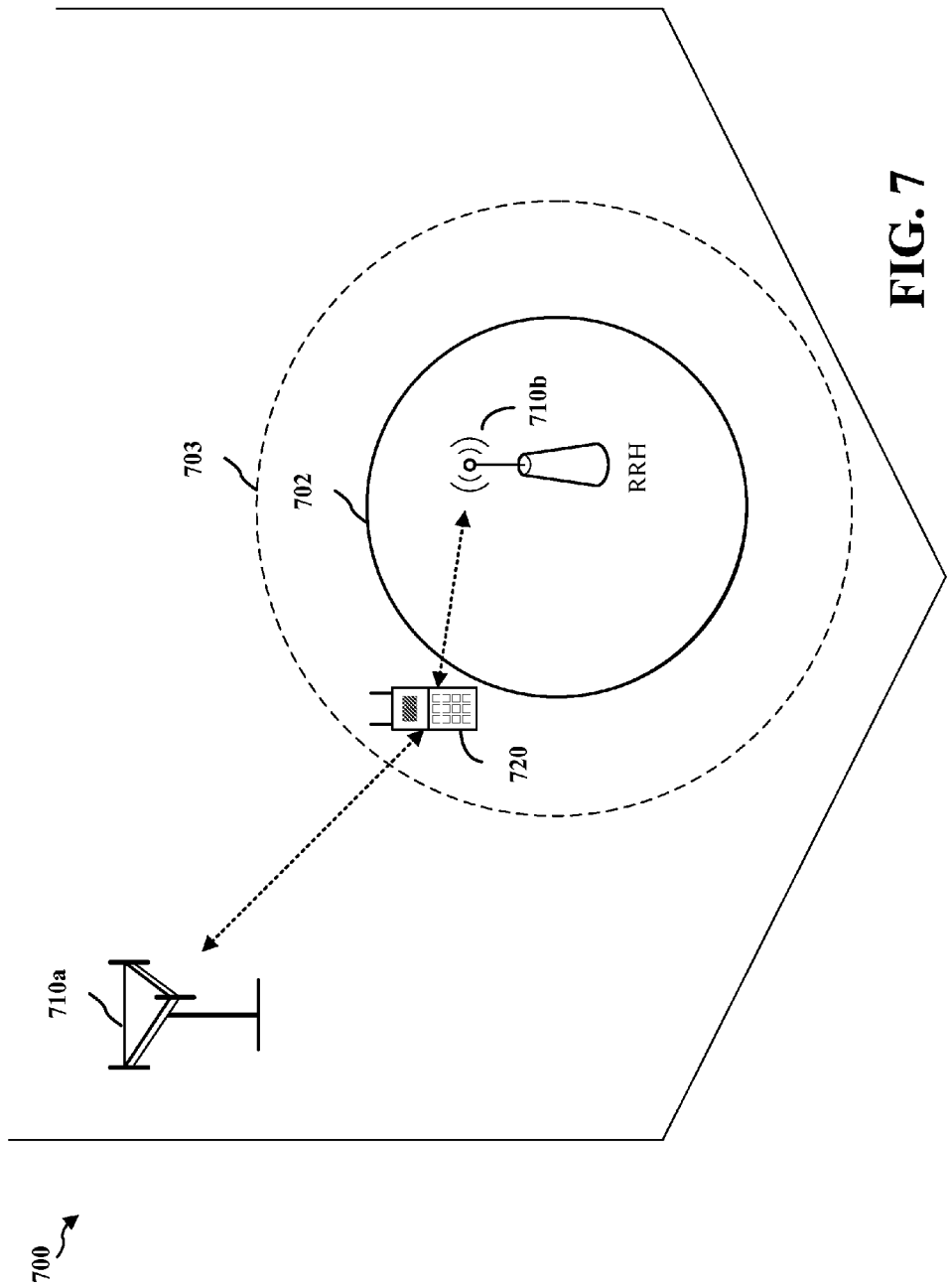
FIG. 7 is a diagram illustrating a range expanded cellular region in a heterogeneous network.

FIG. 7 is a diagram 700 illustrating a range expanded cellular region in a heterogeneous network. A lower power class eNB such as the RRH 710b may have a range expanded cellular region 703 that is expanded from the cellular region 702 through enhanced inter-cell interference coordination between the RRH 710b and the macro eNB 710a and through interference cancelation performed by the UE 720. In enhanced inter-cell interference coordination, the RRH 710b receives information from the macro eNB 710a regarding an interference condition of the UE 720. The information allows the RRH 710b to serve the UE 720 in the range expanded cellular region 703 and to accept a handoff of the UE 720 from the macro eNB 710a as the UE 720 enters the range expanded cellular region 703.

Coordinated multipoint (CoMP) enables the dynamic coordination of transmission and reception using a plurality of different base stations. CoMP transmission schemes typically enable multiple base stations to coordinate transmissions to one or more UEs (DL CoMP) and/or receptions from one or more UEs (UL CoMP). DL CoMP and UL CoMP can be separately or jointly enabled for a UE. In one example, joint transmission DL CoMP uses multiple eNBs to transmit the same data to a UE. In another example, joint reception UL CoMP uses multiple eNBs that receive the same data from a UE. In another example, coordinated beamforming (CBF) involves transmitting from an eNB to a UE using beams that are chosen to reduce interference to UEs in neighboring cells. In another example, dynamic point selection (DPS) enables the cell or cells involved in data transmissions to change from subframe to subframe.

CoMP may be implemented in homogeneous networks and/or heterogeneous networks (HetNet). Multiple eNBs may cooperate to determine scheduling, transmission parameters, and transmit antenna weights for a UE. Nodes involved in CoMP can be connected using an X2 interface, which may be characterized by some latency and limited bandwidth, and/or by fiber to minimize latency and obtain greater bandwidth that is effectively "unlimited bandwidth." In HetNet CoMP, a low power node may be referred to as an RRH.

Two reference signals that are transmitted from the same or from different cells can be said to be quasi-co-located (QCL) if they have at least the same frequency shift, Doppler spread, received timing, and/or delay spread from the UE perspective. CoMP operation may require certain PDSCH resource element (RE) mapping, and QCL of channel state information reference signals (CSI-RS) and user equipment reference signals (UE-RS) (also known as demodulation reference signals (DMRS)). For RRC signaling, up to four sets of PDSCH RE mapping and QCL parameters per component carrier may be indicated by DCI. In one example, DCI signaling may include a new DCI bit that together with nSCID, dynamically selects the PDSCH RE mapping and QCL parameter set among four parameter sets configured by higher layers. For example, the new DCI bit may be referred to as a "PDSCH RE Mapping and Quasi-Co-Location Indicator" (PQI) bit. In an aspect, the PQI bit may be added to the contents of DCI format 2C to form the DCI format 2D for downlink transmission mode (TM) 10. In another aspect, two PQI bits may be added to the contents of DCI format 2C to form the DCI format for downlink TM 10.

Each of the sets that can be signaled in DCI may correspond to a higher-layer list of parameters. In an aspect, the higher-layer list of parameters may include a number of cell-specific reference signal (CRS) ports $\{1, 2, 4, \ldots, x\}$, a CRS frequency shift, an MBSFN subframe configuration, a configuration of ZP CSI-RS, a PDSCH starting symbol that may be a value N=$\{0$ or reserved value, 1, 2, 3, 4 (only for system bandwidth<=10 PRBs), a physical control format indicator channel (PCFICH) of a serving cell in case of non-cross-scheduling or higher-layer configured value in case of cross-carrier scheduling$\}$, and/or an NZP CSI-RS resource index, where QCL is assumed between UE-RS and the CSI-RS resource.

A UE can be configured to handle up to five component carriers (CCs) for carrier aggregation (CA), where one of the component carriers is designated as the primary CC (PCC) while the remaining component carriers are referred to as secondary CCs (SCC). Cross-carrier scheduling may be supported for a UE with CA, where a PDSCH can be scheduled on an SCC (also referred to as the scheduled CC) by a physical downlink control channel (PDCCH) on a different CC (also referred to as the scheduling CC) which can be a PCC or an SCC. In this case, a 3-bit cross-carrier indicator field (CIF) may be included in the downlink control information (DCI) for both the scheduling CC and the scheduled CC. The scheduling CC may include UE-specific search space not only for itself, but also for the CCs that are cross-scheduled by the scheduling CC. The two or more UE-specific search spaces for PDSCH transmissions on two or more different CCs can be a function of the CIFs configured for each respective CC, and may be designed to avoid search space overlapping among the two or more CCs to a large extent.

DCI may be carried in a PDCCH. DCI may include transmission resource assignments and other control information for a UE or group of UEs. PDCCH is located in a first several symbols in a subframe and are fully distributed across the entire system bandwidth. PDCCH is time division multiplexed with PDSCH. The PDCCH is transmitted in a subframe and the subframe is effectively divided into a control region and a data region.

Enhanced PDCCH (EPDCCH) can facilitate frequency-domain based inter-cell interference coordination and the presence of EPDCCH on a carrier may be subframe dependent, such that EPDCCH may not always be present in all subframes.

In contrast to PDCCH, which occupies the first several control symbols in a subframe, EPDCCH occupies the data region of the subframe, similar to PDSCH. Certain enhancements may be enabled by EPDCCH, including increased control channel capacity, support for frequency-domain inter-cell interference coordination (ICIC), improved spatial reuse of control channel resources, and support for beamforming and/or diversity. Moreover, EPDCCH may be used in additional new carrier types and in subframes of a multicast-broadcast single frequency network (MBSFN).

Typically, EPDCCH can coexist on the same carrier as legacy UEs configured to obtain control information from PDCCH.

In certain aspects, both localized and distributed transmission of EPDCCH is supported. A UE-RS based EPDCCH may be supported. UE-RS may use antenna ports 107, 108, 109, and 110, whereas PDSCH utilizes antenna ports 7-14.

EPDCCH is based on frequency division multiplexing (FDM), spanning both the first and second slots of a subframe. A restriction may be placed on the maximum number of transport channel (TrCH) bits receivable in a transmission time interval (TTI) such that a relaxation of the processing requirements for the UE can be achieved. For example, the restriction on the maximum number of TrCH bits receivable in a TTI may depend on UE capability or whether a condition is satisfied (e.g., when a round trip time (RTT)>100 us). Multiplexing of PDSCH and EPDCCH within a physical resource block (PRB) pair may not be permitted. In one example, a PRB may be configured as a unit of transmission resource including 12 sub-carriers in the frequency domain and 1 timeslot (0.5 ms) in the time domain.

An RE that collides with any other signal is typically not used for EPDCCH. Coding chain rate-matching may be used for CRS, and for new antenna ports on a new carrier type (NCT). Coding chain rate-matching may be also used for a legacy control region (a region up to the PDSCH starting position) for physical broadcast channel (PBCH) and PSS and/or secondary synchronization signals (SSS) when EPDCCH transmission in these PRB pairs is supported. Coding chain rate-matching may be also used around zero power (ZP) and non-zero power (NZP) CSI-RS configured for the UE receiving the EPDCCH.

In subframes where a UE monitors EPDCCH UE search space (USS) on a first carrier, the UE typically does not monitor PDCCH USS on the same carrier. A configuration may define whether localized or distributed EPDCCH candidates are monitored in a particular subframe. The UE also typically monitors the common search space (CSS) on PDCCH. Alternatively, the UE may monitor the CSS on ePDCCH, if CSS on ePDCCH is supported in the subframe, e.g., in a new carrier type. The UE can be configured to monitor both localized and distributed EPDCCH candidates in a subframe. If the UE is configured to monitor both localized and distributed EPDCCH candidates in a subframe, the total number of USS blind decodes on the carrier may not be increased.

The subframes in which EPDCCH USS is monitored by the UE may be predefined by networking standards. In one example, in special subframes with a configuration of 0 and 5 for normal cyclic prefix (CP), and 0 and 4 for extended CP, EPDCCH may not be monitored by the UE. Monitored subframes can also be configured by higher layer signaling. In subframes not configured for monitoring EPDCCH, the UE may monitor CSS and/or USS on PDCCH.

A UE can be configured with K EPDCCH resource sets (where K≥1), e.g., up to two sets. An EPDCCH resource set may be defined as a group of N PRB pairs, and each EPDCCH resource set may define its own size (e.g., 2, 4 or 8 PRB pairs). The total number of blind decoding attempts is independent from K, and the total blind decoding attempts for a UE may be split into configured K EPDCCH resource sets. Each EPDCCH resource set may be configured for either localized EPDCCH or distributed EPDCCH. PRB pairs of EPDCCH resource sets with different logical EPDCCH set indices can be fully overlapped, partially overlapped, or may be non-overlapping.

The same scrambling sequence generator defined for a PDSCH UE-RS can be used for EPDCCH UE-RS. In one example, the scrambling sequence generator of UE-RS for EPDCCH on ports 107 through 110 is initialized by:

$$c_{init}=([n_s/2]+1)\cdot(2X+1)\cdot 2^{16}+n_{SCID}$$

where $c_{init}$ represents an initialization value, $n_s$ represents a slot number within a radio frame, X represents a candidate value, and $n_{SCID}$ represents a scrambling identifier. For example, X may be configured by UE-specific higher layer signaling, one value per set, and the default value of X for the second set may be the same as the value for the first set.

A starting symbol may be preconfigured for EPDCCH. The starting symbol may be configured by per-cell, higher layer signaling, which may be transmitted to indicate the OFDM starting symbol for any EPDCCH sent on a cell and PDSCH on that cell may be scheduled by EPDCCH. If the starting symbol is not provided, the starting OFDM symbol of EPDCCH and PDSCH scheduled by EPDCCH is typically derived from PCFICH. A single value of OFDM starting symbol may be applicable to both EPDCCH resource sets, when two sets are configured. Alternatively, the OFDM starting symbol may be separately configured for each of the K EPDCCH resource sets.

QCL may be used with EPDCCH. A UE may be configured by higher layer signaling and a QCL-CSI-RS-Index can be transmitted to indicate the quasi-collocation assumption as EPDCCH UE-RS. The QCL-CSI-RS-Index may be configured per EPDCCH resource set. When signaling is provided, EPDCCH UE-RS ports typically may not be assumed as quasi co-located with any RS port, with the exception that all EPDCCH UE-RS ports within the EPDCCH resource set may be assumed as quasi co-located with the CSI-RS resource indicated by QCL-CSI-RS-Index with respect to delay spread, doppler spread, doppler shift, and/or average delay. It should be noted that the QCL-CSI-RS-Index corresponds to a non-zero power CSI-RS resource from a CoMP measurement set.

When signaling is not provided, all EPDCCH UE-RS ports may be assumed to be quasi co-located with CRS for the serving cell with respect to delay spread, doppler spread, doppler shift, and/or average delay.

EPDCCH is transmitted using resources in units of enhanced control channel elements (ECCEs). An ECCE may be formed by a number N enhanced resource element groups (EREGs) in distributed and localized transmission. As an example, in a normal subframe (with normal CP) or special subframe configurations 3, 4, 8 (with normal CP), each EREG may consist of 9 resource elements (REs) in a PRB pair. In an aspect, each ECCE may be configured to include 4 EREGs (e.g., N=4) or 36 REs. For example, if each PRB pair consist of 144 REs, which is 16 EREGs, each PRB pair may consist of four ECCEs (e.g., 16 EREGs) that can be available for localized or distributed transmission(s). In special subframe configurations 1, 2, 6, 7, 9 (with normal CP), a normal subframe (with extended CP), and special subframe configurations 1, 2, 3, 5, 6 (with extended CP), N may be set to 8. In this example, two ECCEs (each of 8 EREGs) per PRB pair may be available for localized transmission(s).

In normal subframes (with normal CP) or special subframe configurations 3, 4, 8 (with normal CP), and where the available REs in a PRB pair is less than $X_{thresh}$, the aggregation levels supported for EPDCCH include 2, 4, 8, 16 for localized EPDCCH and 2, 4, 8, 16, 32 for distributed EPDCCH, where an aggregation level of L consists of L ECCEs. In all other cases, the supported aggregation levels include 1, 2, 4, and 8 for localized EPDCCH and 1, 2, 4, 8 and 16 for distributed EPDCCH.

Aggregation levels supported for EPDCCH when $X_{thresh}$=104: the number of available REs used to compare to $X_{thresh}$ is counted from the UE perspective by considering the UE-specific CSI-RS configuration, but not the CSI-RS configurations for other UEs. The total number of EPDCCH USS blind decodes per CC is typically 32 or 48 depending on the configuration of UL MIMO.

In some aspects, one or more EPDCCH parameters may be configured to correspond to same or similar parameters defined for PDSCH. Such parameters may include starting symbol, rate-matching and/or QCL indication parameters. A predefined rule or RRC configuration can specify the linkage between EPDCCH and PDSCH sets. In one example, up to four sets of starting symbol, rate-matching and QCL states may be configured for PDSCH and up to two sets of starting symbol, rate-matching and QCL states can be defined for EPDCCH. In such example, one of the two sets may be defined for a first EPDCCH resource set and the other of the two sets may be defined for a second EPDCCH resource set. For example, a predefined rule may require that a first EPDCCH resource set assumes the values of a first set of parameters configured for PDSCH, and a second EPDCCH resource set assumes the values of a second set of parameters configured for PDSCH. The EPDCCH resource sets may define values for starting symbol, rate-matching and QCL operation for EPDCCH.

In some aspects, a UE may be configured to perform rate-matching based on one or more of CSI-RS and CRS for EPDCCH. For example, a UE may be configured to always rate-match around all CSI-RS configurations defined for the UE. In such aspects, there is typically no EPDCCH resource set-dependency, and no selective CSI-RS rate matching.

In some aspects, a UE may be configured to perform selective and/or set-dependent CSI-RS rate-matching. In such aspects, the number of available REs for EPDCCH in a PRB pair may be set-dependent. For example, when the number of available REs in each of two EPDCCH resource sets are compared with $X_{thresh}$, one EPDCCH resource set may have one aggregation level set (e.g., aggregation level set {1, 2, 4, 8}) and the other EPDCCH resource set may have a different aggregation level set (e.g., aggregation level set {2, 4, 8, 16}).

For CSI-RS, the determination of aggregation level (e.g., comparing RE availability with $X_{thresh}$) may be EPDCCH resource set independent or EPDCCH resource set-dependent. Rate-matching around CSI-RS in an EPDCCH coding chain can be EPDCCH resource set independent or EPDCCH resource set-dependent. For example, a UE may determine the aggregation level by assuming that all CSI-RS configured for a UE are excluded. However, a UE may determine rate-matching by excluding only a subset of CSI-RS configured for the UE. In some embodiments, the same CSI-RS selectivity may be employed for both aggregation level determination and rate-matching around CSI-RS in a coding chain for a given EPDCCH resource set.

In some aspects, selective and/or set-dependent CRS rate-matching can be defined. The CRS used may be the CRS of a serving cell, or one or more neighboring cells. The CRS configuration can be different for different cells. In one example, the CRS configuration may be defined as a number of ports and a frequency shift, for both MBSFN subframes and non-MBSFN subframes. In some embodiments, set-dependency and subframe-dependency (MBSFN vs. non-MBSFN) can be applied.

In one example, a UE is configured with CSI-RS indices (e.g., indices 1, 2, 3, 4, 5, 6, 7) for both PDSCH and ePDCCH. Of the CSI-RS indices, a subset (e.g., indices 1, 2, 3, 4) may be assigned to NZP CSI-RS, and another subset (e.g., indices 5, 6, 7) may be assigned to ZP CSI-RS. Each of the CSI-RS indices may be separately associated with a certain number of CSI-RS ports and REs. Furthermore, there may be two EPDCCH resource sets, which may correspond for example to different eNBs. The two EPDCCH resource sets may have associated CSI-RS indices of (1) for EPDCCH resource set 1, and (2,3) for EPDCCH resource set 2.

In some aspects, the total number of combined rate matching and QCL states across the PDSCH and PDCCH does not exceed four. It should be understood that various embodiments of the invention may employ different techniques to determine which resources are usable and to rate match around resources assigned to or used for CSI-RS.

In an aspect, a non-selective and set-independent approach may be employed for determining usable resources for EPDCCH and for rate-matching around CSI-RS, where all CSI-RS indices are considered. For example, the total of CSI-RS indices (e.g., indices 1, 2, 3, 4, 5, 6, 7), whether usable or not, may be assumed to be allocated and/or unusable in order to determine which resources are usable for EPDCCH and for rate-matching around CSI-RS.

In an aspect, a selective and set-independent approach may be employed for determining usable resources for EPDCCH and for rate-matching around CSI-RS, where a common set of CSI-RS indices is considered. For example, the common set may be a subset of all the CSI-RS indices (e.g., a subset including indices 1, 2, 3) which are configured for CSI-RS in one or other EPDCCH sets and should then be considered in determining EPDCCH for both usable resource determination and rate match around.

In an aspect, a selective and partial set-dependent approach may be employed for determining usable resources for EPDCCH and for rate-matching around CSI-RS, where a common set of CSI-RS indices is considered. In such aspect, however, rate-matching may be set specific. For example, the available number of resources may be determined using CSI-RS indices (e.g., indices 1, 2, 3) configured for CSI-RS for EPDCCH. The available number of resources may then be compared with $X_{thresh}$ to determine a set of aggregation levels. The determined set of aggregation levels may be considered as a common set of aggregation levels that may be applied to both EPDCCH resource sets. However, CSI-RS indices (1) may be used for rate matching in EPDCCH set 1, and CSI-RS indices (2,3) may be used for rate matching in EPDCCH set 2.

In certain aspects, one or more rules may be applied in different scenarios when determining the common number of usable REs. For example, the one or more rules may include a rule to use total resources of NZP CSI-RS, e.g. (indices 1, 2, 3, 4), a rule to use total resources of CSI-RS for ePDCCH, e.g. (indices 1, 2, 3), a rule to use minimum of the two set, e.g. (index 1), and/or a rule to use maximum of the two sets, e.g. (indices 2, 3).

As also discussed herein, certain embodiments employ other approaches and apply different rules. For example, a selective and set-dependent approach may be employed whereby both usable resource determination and rate-matching are selective and set-dependent. It should be understood that the previously discussed principles and approaches can be applied for dealing with CRS and other signals.

In an aspect, for the case of PDSCH, a UE may be configured to rate match around all configured NZP CSI-RS resources while allowing for set-dependent ZP CSI-RS rate matching definitions. In such aspect, the same definitions may be applied for the EPDCCH.

In an aspect, when an EPDCCH starting symbol in a subframe is zero, a UE may monitor and decode legacy control in the subframe or refrain from monitoring and decoding the legacy control in the subframe. Legacy control may include PCFICH, PHICH, and a common search space. In another aspect, the UE may be configured to skip decoding in some EPDCCH subframes. The UE may skip decoding of all legacy control, or only a subset of legacy control. For example, the UE may decode PCFICH, but skip decoding PHICH and the common search space. By decoding channels, such as PCFICH, the UE may be able to determine starting symbol for PDSCH based on the PCFICH.

In one example, the UE may be configured to skip decoding EPDCCH subframes that do not carry DL broadcast transmissions, such as MBSFN subframes used for unicast. In another example, the UE may be configured to skip decoding EPDCCH subframes when the starting symbol for EPDCCH for two or more EPDCCH resource sets is zero.

When EPDCCH symbols are mapped to the first symbol in an EPDCCH subframe, rate-matching operations may completely ignore the control region. For example, the rate-matching operations may completely ignore the control region when the UE attempts to decode legacy control. In some embodiments, ePDCCH symbols may be mapped only to the tones in the first symbol that do not contain at least some legacy control, such as tones that carry PCFICH.

Figure 8:
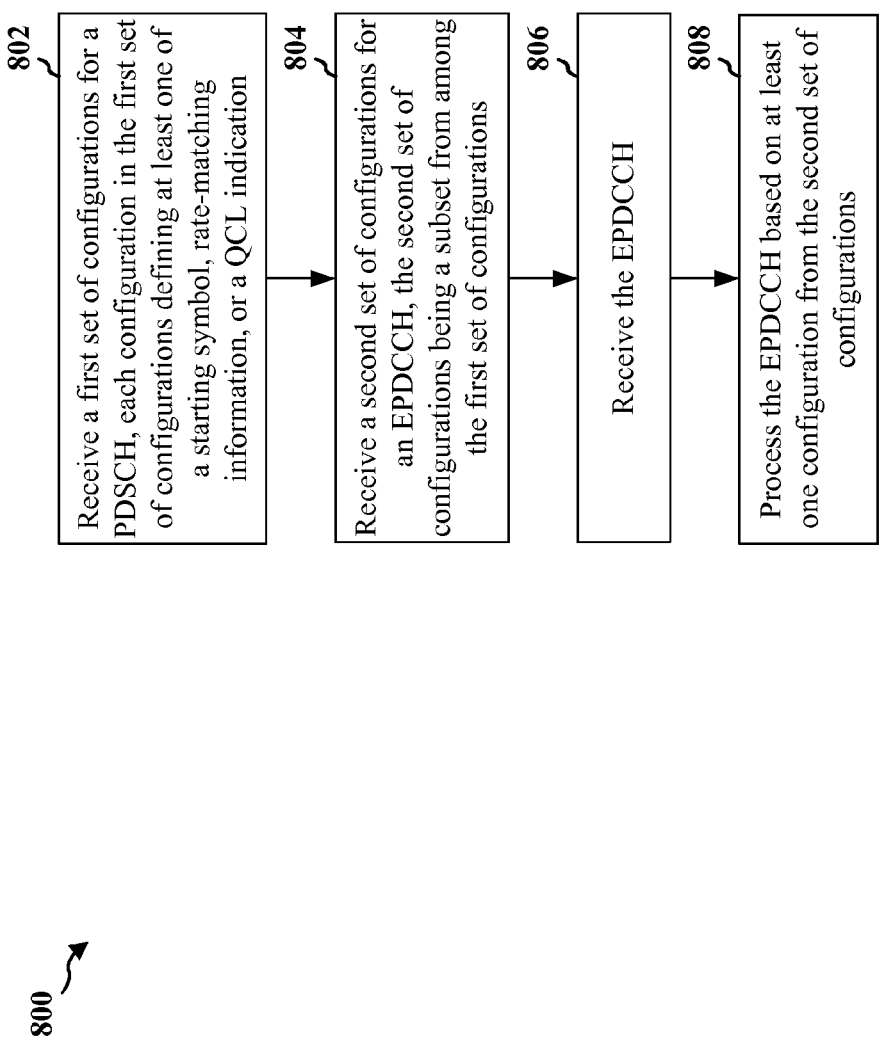
FIG. 8 is a flow chart of a method of wireless communication.

FIG. 8 includes a flow chart 800 of a method of wireless communication. The method may be performed by a UE, such as UE 720. At step 802, the UE receives a first set of configurations for a PDSCH, each configuration in the first set of configurations defining at least one of a starting symbol, rate-matching information, or a QCL indication. In an aspect, the first set of configurations includes four PDSCH configurations. In an aspect, the PDSCH is implemented in a coordinated multipoint system.

At step 804, the UE receives a second set of configurations for an EPDCCH, the second set of configurations being a subset from among the first set of configurations. In an aspect, the EPDCCH may be included in a first resource set and a second resource set, and the second set of configurations includes a first EPDCCH configuration and a second EPDCCH configuration. In such aspect, the first EPDCCH configuration may be defined for processing the EPDCCH on the first resource set and the second EPDCCH configuration may be defined for processing the EPDCCH on the second resource set. In an aspect, the second set of configurations includes two EPDCCH configurations that are a subset from among the four PDSCH configurations. For example, for a given serving cell, if the UE is configured via higher layer signaling to receive PDSCH data transmissions according to transmission mode 10, and if the UE is configured to monitor EPDCCH, for each EPDCCH-PRB-set, the UE may use the parameter set indicated by a the higher layer parameter (e.g., re-MappingQCLConfigListId-r11) for determining the EPDCCH RE mapping and EPDCCH antenna port quasi co-location. In an aspect, the second set of configurations is selected from the first of configurations based on an RRC configuration At step 806, the UE receives the EPDCCH. In an aspect, EPDCCH is received on the first resource set and the second resource set.

At step 808, the UE processes the EPDCCH based on at least one configuration from the second set of configurations.

Figure 9:
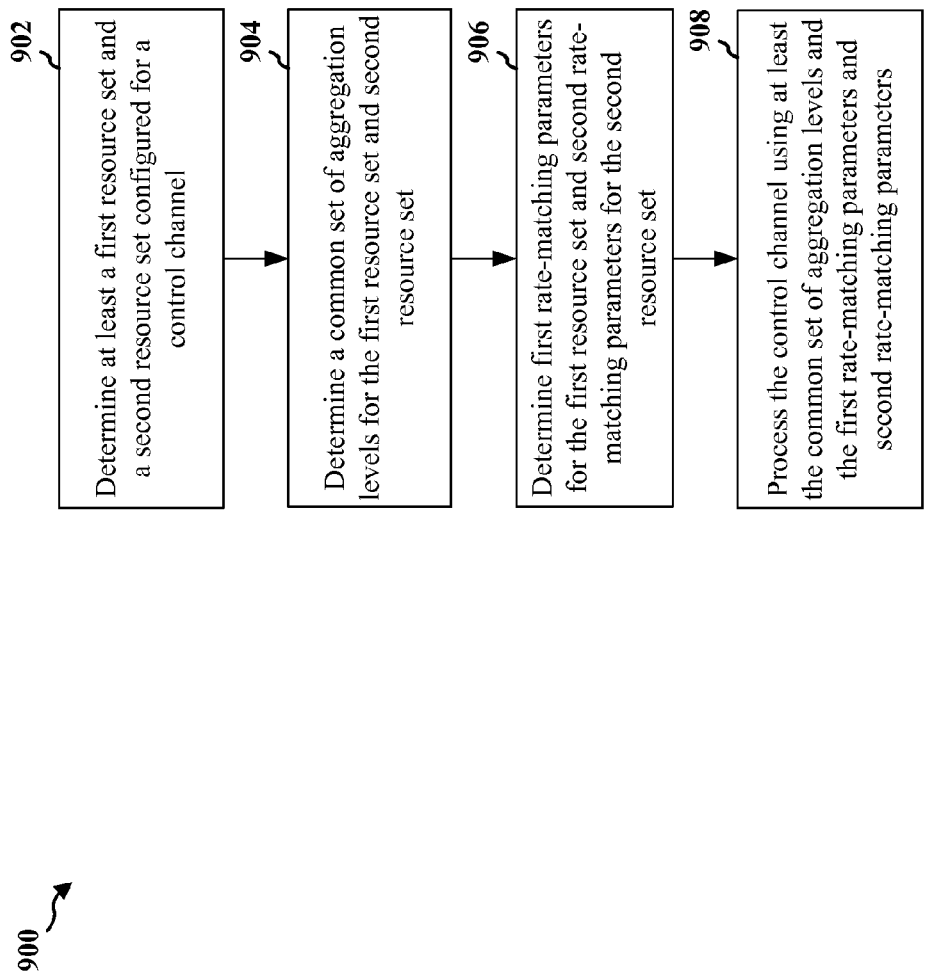
FIG. 9 is a flow chart of a method of wireless communication.

FIG. 9 includes a flow chart 900 of a method of wireless communication. The method may be performed by a UE, such as UE 720. At step 902, the UE determines at least a first resource set and a second resource set configured for a control channel. In an aspect, the control channel may be an EPDCCH.

At step 904, the UE determines a common set of aggregation levels for the first resource set and the second resource set. In an aspect, the UE determines the common set of aggregation levels by determining at least a first number of available resources in the first resource set, a second number of available resources in the second resource set, or both. In an aspect, the UE may determine the common set of aggregation levels by comparing the first number of available resources to a threshold value, the second number of available resources to a threshold value, or both, and selecting the common set of aggregation levels based on the comparison.

For example, a UE may determine that a first PRB pair (e.g., consisting of 12 tones and 14 symbols in a normal CP configuration) allocated as a first resource set for EPDCCH includes a total of 168 REs and a second PRB pair (e.g., consisting of 12 tones and 14 symbols in a normal CP configuration) allocated as a second resource set for EPDCCH includes a total of 168 REs. The UE may further determine that 120 REs of the 168 REs are available in the first resource set for EPDCCH and that 80 REs of the 168 REs are available in the second resource set for EPDCCH. The UE may compare the determined number of available REs in the first and second resource sets for EPDCCH to a predetermined threshold value $X_{thresh}$. For example, $X_{thresh}$ may be set to 104 and the UE may use an aggregation level {1, 2, 4, 8} for monitoring a resource set for EPDCCH if the determined number of available REs in the resource set for EPDCCH is equal to or greater than 104. Otherwise, if the determined number of available REs in the resource set for EPDCCH is less than 104, the UE may use an aggregation level {2, 4, 8, 16} for monitoring the resource set for EPDCCH. In an aspect, the UE may select the largest determined aggregation level (e.g., aggregation level {2, 4, 8, 16}) as the common aggregation level for monitoring both the first and second resource sets for EPDCCH.

At step 906, the UE determines first rate-matching parameters for the first resource set and second rate-matching parameters for the second resource set. In an aspect, the first rate-matching parameters are configured to rate-match around all CSI-RS in the first resource set or rate-match around a subset of the CSI-RS in the first resource set. In such aspect, the second rate-matching parameters are configured to rate-match around all of the CSI-RS on the second resource set or rate-match around a subset of the CSI-RS on the second resource set.

In an aspect, the first rate-matching parameters are configured to rate-match around all CRS in the first resource set or rate-match around a subset of the CRS on the first resource set. In such aspect, the second rate-matching parameters are configured to rate-match around all of the CRS on the second resource set or rate-match around a subset of the CRS in the second resource set. In an aspect, the first rate-matching parameters are determined based on a first RRC configuration and the second rate-matching parameters are determined based on a second RRC configuration.

At step 908, the UE processes the control channel using at least the common set of aggregation levels and the first rate-matching parameters and second rate-matching parameters.

Figure 10:
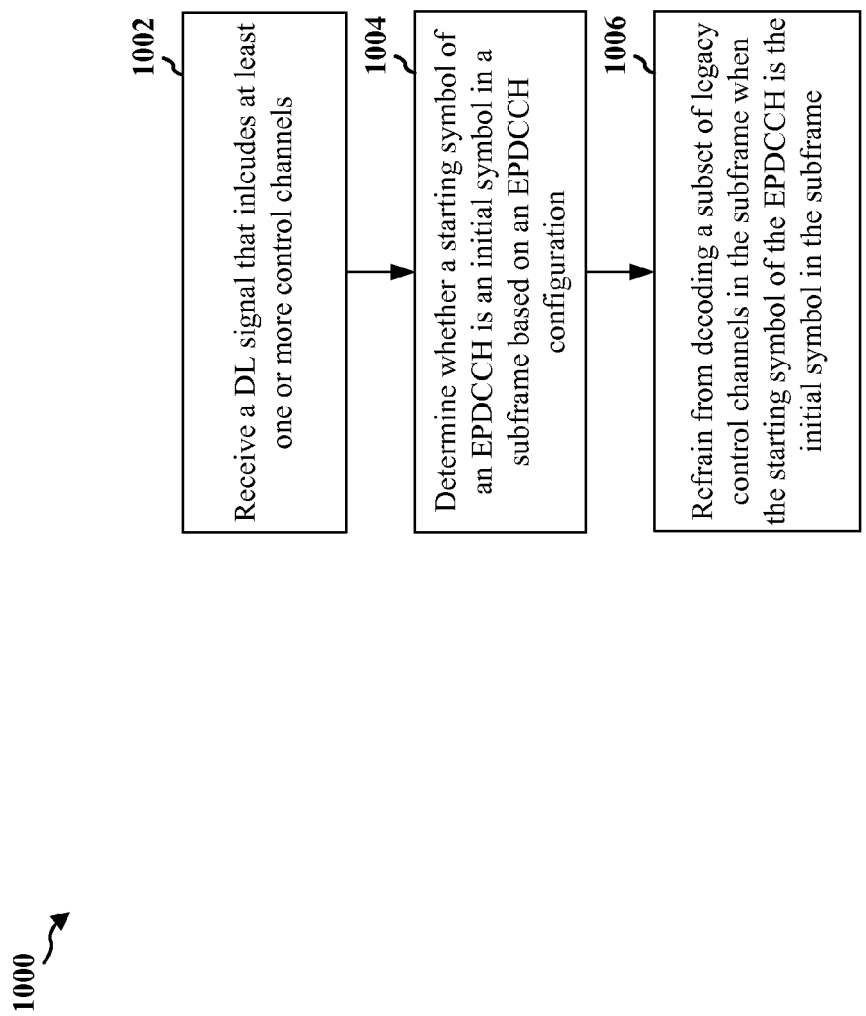
FIG. 10 is a flow chart of a method of wireless communication.

FIG. 10 includes a flow chart 1000 of a method of wireless communication. The method may be performed by a UE. At step 1002, the UE receives a DL signal that includes at least one or more control channels. In an aspect, the control channel may be an EPDCCH.

At step 1004, the UE determines whether a starting symbol of an EPDCCH is an initial symbol in a subframe based on an EPDCCH configuration.

At step 1006, the UE refrains from decoding a subset of legacy control channels in the subframe when the starting symbol of the EPDCCH is the initial symbol in the subframe. In an aspect, the legacy control channels include at least one of a PCFICH, a PHICH, or a combination thereof. In an aspect, the UE refrains from decoding a subset of legacy control channels by refraining from decoding the subset of legacy control channels in the subframe when the subframe does not include a DL broadcast transmission.

In an aspect, the EPDCCH configuration may identify a first EPDCCH resource set and a second EPDCCH resource set. In such aspect, the UE refrains from decoding a subset of legacy control channels by refraining from decoding the subset of legacy control channels in the subframe when both a starting symbol of the first EPDCCH resource set and a starting symbol of the second EPDCCH resource set are the initial symbol in the subframe.

Figure 11:
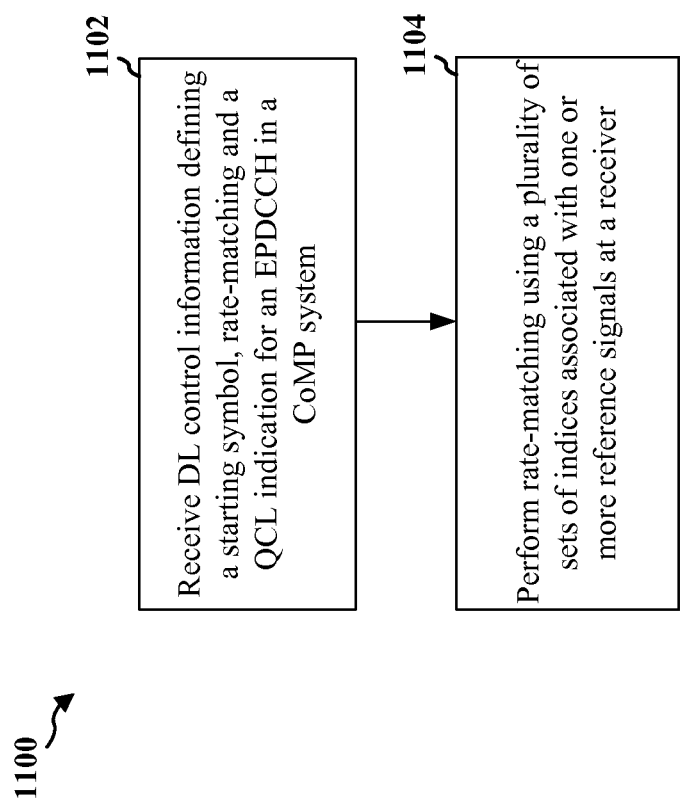
FIG. 11 is a flow chart of a method of wireless communication.

FIG. 11 includes a flow chart 1100 of a method of wireless communication. The method may be performed by a UE, such as UE 720. At step 1102, the UE receives downlink control information including sets of parameters defining EPDCCH resource element mapping and quasi-co-location parameters related to two or more transmitters in a coordinated multipoint system.

At step 1104, the UE performs rate-matching around CSI-RS or CRS at a receiver using on one or more of the plurality of the sets of parameters. In some embodiments, the rate-matching is performed around the CSI-RS using a set of parameters that is selected based on an aggregation level associated with the selected set of parameters. Each set of parameters may define one or more of a configuration of CSI-RS, a PDSCH starting symbol, PCFICH of a serving cell, and a NZP CSI-RS resource index.

In some embodiments, the rate-matching is performed around the CRS using a set of parameters that is selected based on an aggregation level associated with the selected set of parameters. Each set of parameters may define one or more of a number of a CRS port, a CRS frequency shift, and a MBSFN subframe configuration. The CRS may relate to a serving cell.

In some embodiments, the UE determines whether a starting symbol of EPDCCHs is a zero symbol (also referred to as the "initial symbol"), decoding control information in the EPDCCHs when the starting symbol is not the zero symbol, and refraining from decoding control information in at least some of the EPDCCHs when the starting symbol is the zero symbol.

Figure 12:
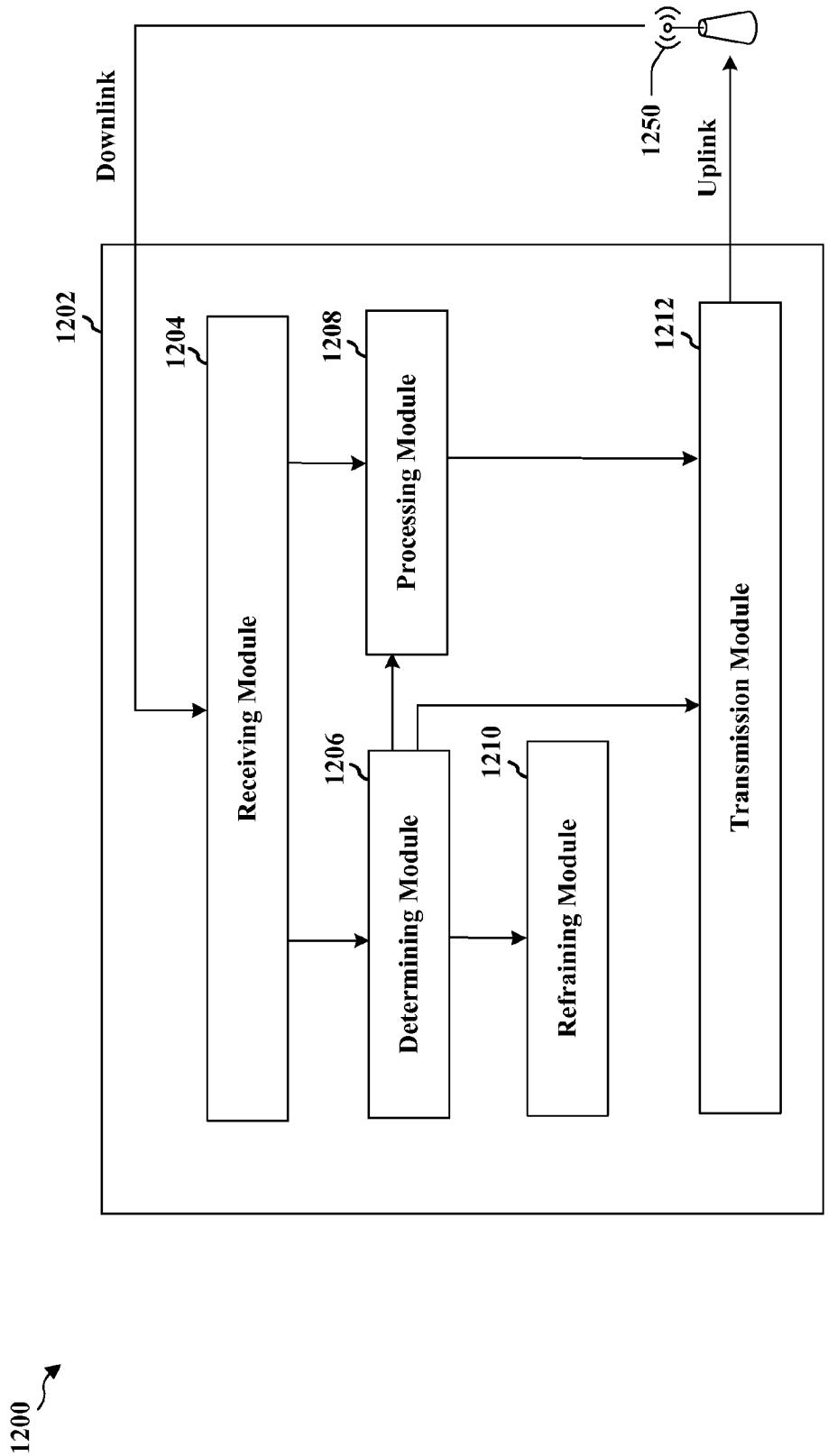
FIG. 12 is a conceptual data flow diagram illustrating the data flow between different modules/means/components in an exemplary apparatus.

FIG. 12 is a conceptual data flow diagram 1200 illustrating the data flow between different modules/means/components in an exemplary apparatus 1202. The apparatus may be a UE. The apparatus includes a module 1204 that receives a DL signal that inlcudes at least one or more control channels, receives a first set of configurations for a PDSCH, each configuration in the first set of configurations defining at least one of a starting symbol, rate-matching information, or a QCL indication, receives a second set of configurations for an EPDCCH, the second set of configurations being a subset from among the first set of configurations, and/or receives the EPDCCH.

The apparatus further inlcudes a module 1206 that determines at least a first resource set and a second resource set configured for a control channel, determines a common set of aggregation levels for the first resource set and the second resource set, determines first rate-matching parameters for the first resource set and second rate-matching parameters for the second resource set, and/or determines whether a starting symbol of an EPDCCH is an initial symbol in a subframe.

The apparatus further includes a module 1208 that processes the EPDCCH based on at least one configuration from the second set of configurations and/or processes the control channel using at least the common set of aggregation levels and the first rate-matching parameters and second rate-matching parameters.

The apparatus further includes a module 1210 that refrains from decoding a subset of legacy control channels in the subframe when the starting symbol of the EPDCCH is the initial symbol in the subframe, and a module 1212 that transmits UL transmissions to an eNB (e.g., eNB 1250).

The apparatus may include additional modules that perform each of the steps of the algorithm in the aforementioned flow charts of FIGS. 8-11. As such, each step in the aforementioned flow charts of FIGS. 8-11 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 13:
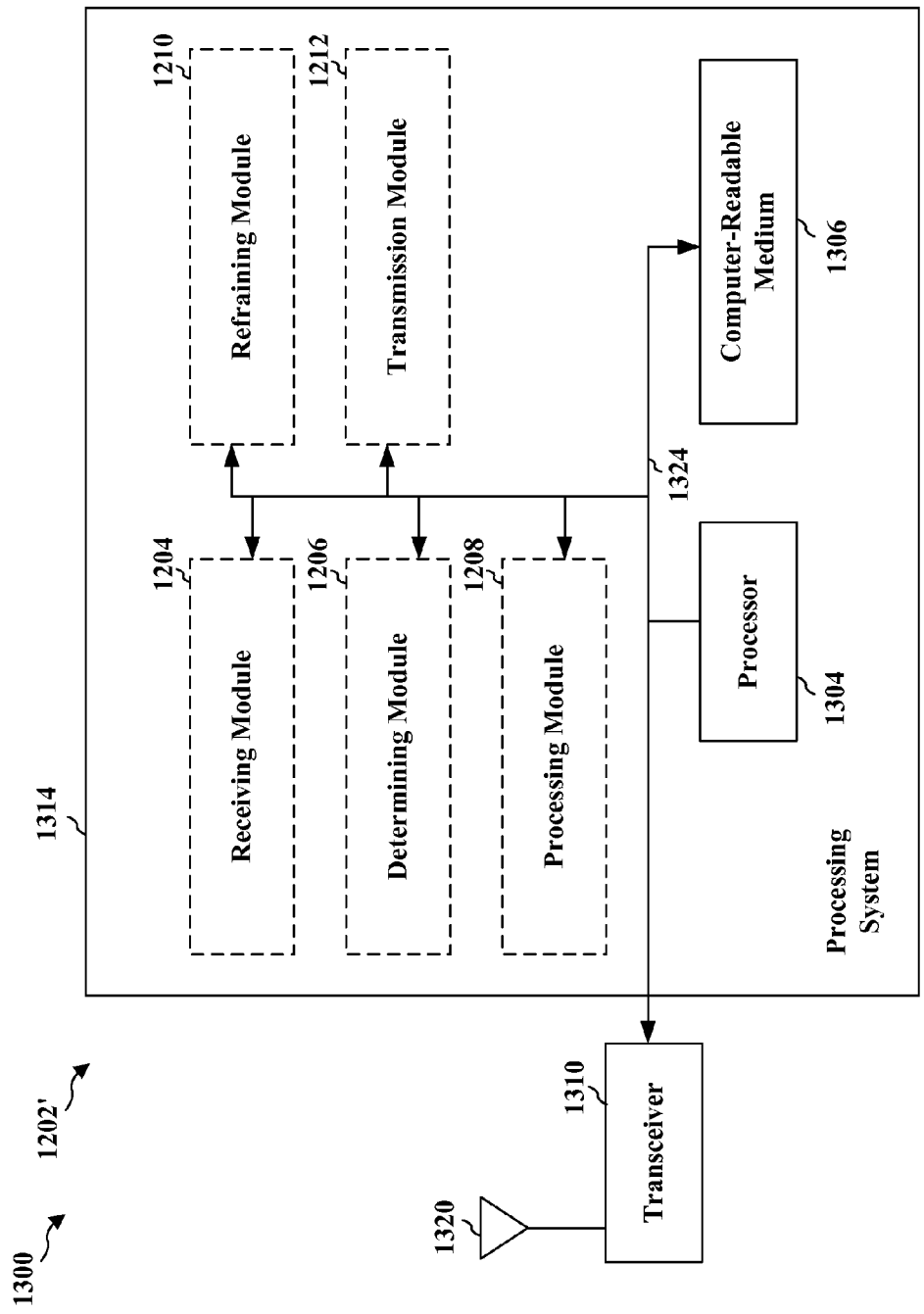
FIG. 13 is a diagram illustrating an example of a hardware implementation for an apparatus employing a processing system.

FIG. 13 is a diagram 1300 illustrating an example of a hardware implementation for an apparatus 1202' employing a processing system 1314. The processing system 1314 may be implemented with a bus architecture, represented generally by the bus 1324. The bus 1324 may include any number of interconnecting buses and bridges depending on the specific application of the processing system 1314 and the overall design constraints. The bus 1324 links together various circuits including one or more processors and/or hardware modules, represented by the processor 1304, the modules 1204, 1206, 1208, 1210, and 1212, and the computer-readable medium/memory 1306. The bus 1324 may also link various other circuits such as timing sources, peripherals, voltage regulators, and power management circuits, which are well known in the art, and therefore, will not be described any further.

The processing system 1314 may be coupled to a transceiver 1310. The transceiver 1310 is coupled to one or more antennas 1320. The transceiver 1310 provides a means for communicating with various other apparatus over a transmission medium. The transceiver 1310 receives a signal from the one or more antennas 1320, extracts information from the received signal, and provides the extracted information to the processing system 1314, specifically the receiving module 1204. In addition, the transceiver 1310 receives information from the processing system 1314, specifically the transmission module 1212, and based on the received information, generates a signal to be applied to the one or more antennas 1320. The processing system 1314 includes a processor 1304 coupled to a computer-readable medium/memory 1306. The processor 1304 is responsible for general processing, including the execution of software stored on the computer-readable medium/memory 1306. The software, when executed by the processor 1304, causes the processing system 1314 to perform the various functions described supra for any particular apparatus. The computer-readable medium/memory 1306 may also be used for storing data that is manipulated by the processor 1304 when executing software. The processing system further includes at least one of the modules 1204, 1206, 1208, 1210, and 1212. The modules may be software modules running in the processor 1304, resident/stored in the computer readable medium/memory 1306, one or more hardware modules coupled to the processor 1304, or some combination thereof. The processing system 1314 may be a component of the UE 650 and may include the memory 660 and/or at least one of the TX processor 668, the RX processor 656, and the controller/processor 659.

In one configuration, the apparatus 1202/1202' for wireless communication includes means for receiving a first set of configurations for a PDSCH, each configuration in the first set of configurations defining at least one of a starting symbol, rate-matching information, or a QCL indication, means for receiving a second set of configurations for an EPDCCH, the second set of configurations being a subset from among the first set of configurations, means for receiving the EPDCCH, means for processing the EPDCCH based on at least one configuration from the second set of configurations, means for determining at least a first resource set and a second resource set configured for a control channel, means for determining a common set of aggregation levels for the first resource set and second resource set, means for determining first rate-matching parameters for the first resource set and second rate-matching parameters for the second resource set, means for processing the control channel using at least the common set of aggregation levels and the first rate-matching parameters and second rate-matching parameters, means for determining whether a starting symbol of an EPDCCH is an initial symbol in a subframe, and means for refraining from decoding a subset of legacy control channels in the subframe when the starting symbol of the EPDCCH is the initial symbol in the subframe. The aforementioned means may be one or more of the aforementioned modules of the apparatus 1202 and/or the processing system 1314 of the apparatus 1202' configured to perform the functions recited by the aforementioned means. As described supra, the processing system 1314 may include the TX Processor 668, the RX Processor 656, and the controller/processor 659. As such, in one configuration, the aforementioned means may be the TX Processor 668, the RX Processor 656, and the controller/processor 659 configured to perform the functions recited by the aforementioned means.

Figure 14:
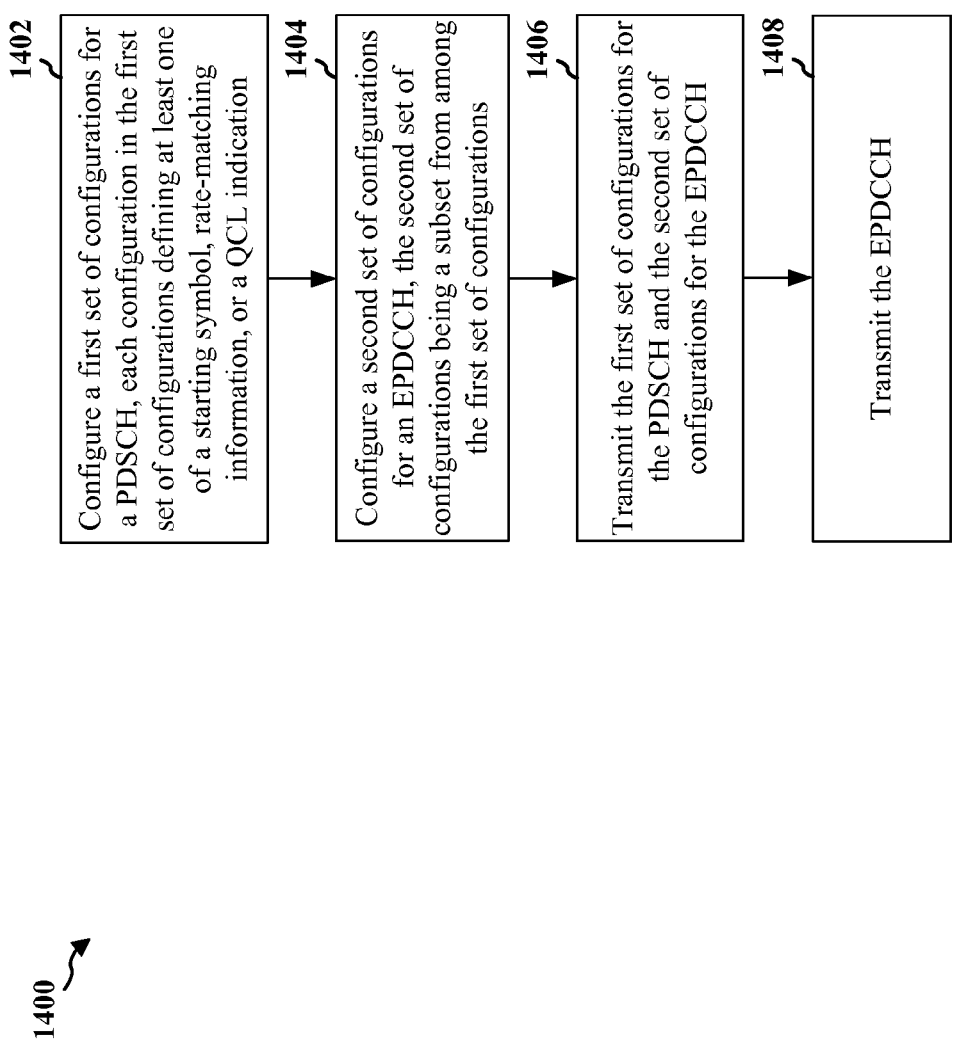
FIG. 14 is a flow chart of a method of wireless communication.

FIG. 14 includes a flow chart 1400 of a method of wireless communication. The method may be performed by an eNB, such as eNB 710a. At step 1402, the eNB configures a first set of configurations for a PDSCH, each configuration in the first set of configurations defining at least one of a starting symbol, rate-matching information, or a QCL indication. In an aspect, the first set of configurations includes four PDSCH configurations. In an aspect, the PDSCH is implemented in a coordinated multipoint system.

At step 1404, the eNB configures a second set of configurations for an EPDCCH, the second set of configurations being a subset from among the first set of configurations. As such, the second set of configurations may be signaled explicitly, or may be a set of indices identifying a subset of configurations from the first set of configurations. Alternatively, the second set of configuration may always be a subset made up of the first N configurations in the first set of configurations, where N is less than the total number of configurations in the first set of configurations, and where N may be pre-determined, static, or dynamic.

In an aspect, the EPDCCH may be included in a first resource set and a second resource set, and the second set of configurations includes a first EPDCCH configuration and a second EPDCCH configuration. In such aspect, the first EPDCCH configuration may be defined for processing the EPDCCH by a UE on the first resource set and the second EPDCCH configuration may be defined for processing the EPDCCH by a UE on the second resource set. In an aspect, the second set of configurations includes two EPDCCH configurations that are a subset from among the four PDSCH configurations. In an aspect, the second set of configurations are selected from the first of configurations based on an RRC configuration.

At step 1406, the eNB transmits the first set of configurations for the PDSCH and the second set of configurations for the EPDCCH.

At step 1408, the eNB transmits the EPDCCH. In an aspect, the eNB transmits the EPDCCH on the first resource set and the second resource set.

Figure 15:
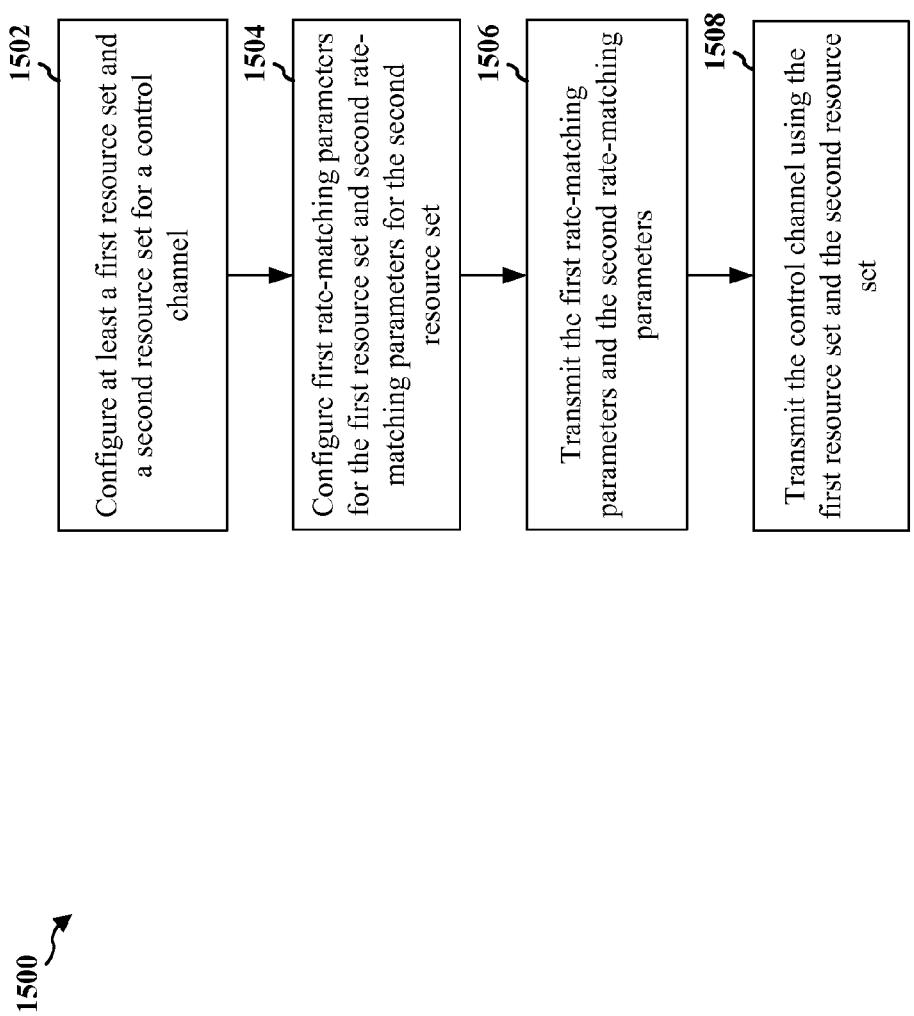
FIG. 15 is a flow chart of a method of wireless communication.

FIG. 15 includes a flow chart 1500 of a method of wireless communication. The method may be performed by an eNB, such as eNB 710a. At step 1502, the eNB configures at least a first resource set and a second resource set for a control channel. The first and second resource sets are configured with a common reference signal configuration. For example, the common reference signal configuration may include a common CSI-RS configuration or a common CRS configuration. In an aspect, the control channel may be an EPDCCH.

At step 1504, the eNB configures first rate-matching parameters for the first resource set and second rate-matching parameters for the second resource set. In an aspect, the first rate-matching parameters indicate that the control channel REs are rate-matched around all CSI-RS in the first resource set or indicate that the control channel REs are rate-matched around a subset of the CSI-RS in the first resource set. In such aspect, the second rate-matching parameters indicate that the control channel REs are rate-matched around all of the CSI-RS on the second resource set or indicate that the control channel REs are rate-matched around a subset of the CSI-RS on the second resource set. In another aspect, the first rate-matching parameters indicate that the control channel REs are rate-matched around all CRS in the first resource set or indicate that the control channel REs are rate-matched around a subset of the CRS on the first resource set. In such aspect, the second rate-matching parameters indicate that the control channel REs are rate-matched around all of the CRS on the second resource set or indicate that the control channel REs are rate-matched around a subset of the CRS in the second resource set. In an aspect, the first rate-matching parameters are configured via a first RRC configuration and the second rate-matching parameters are configured via a second RRC configuration At step 1506, the eNB transmits the first rate-matching parameters and the second rate-matching parameters.

At step 1508, the eNB transmits the control channel using the first resource set and the second resource set. In an aspect, the control channel is processed by a receiving device, such as a UE, using at least a common set of aggregation levels and the first rate-matching parameters and second rate-matching parameters.

Figure 16:
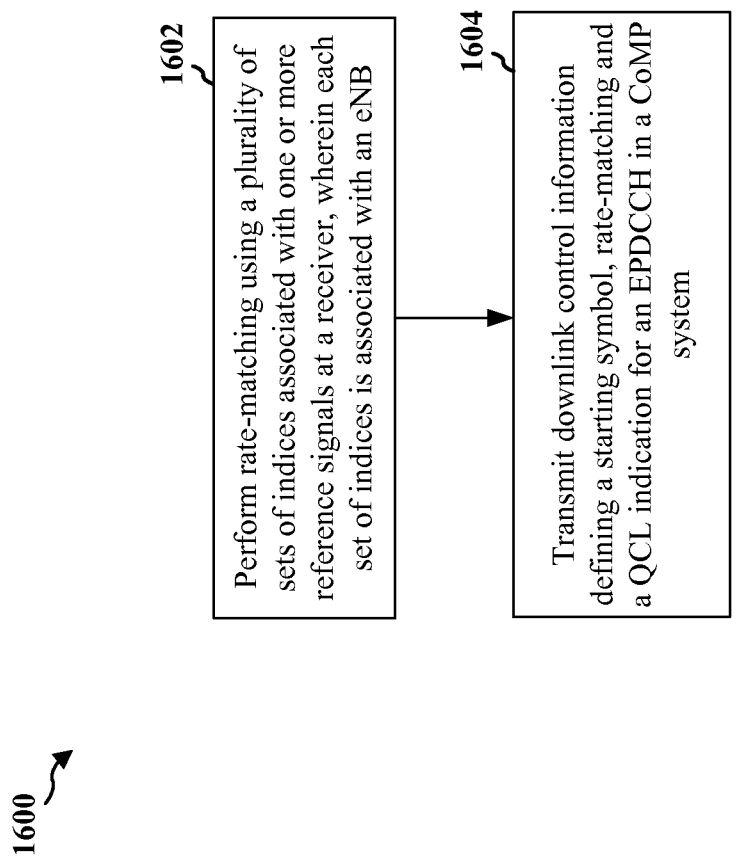
FIG. 16 is a flow chart of a method of wireless communication.

FIG. 16 includes a flow chart 1600 of a method of wireless communication. The method may be performed by an eNB, such as eNB 710a. At step 1602, the eNB performs rate-matching using a plurality of sets of indices associated with one or more reference signals at a receiver, wherein each set of indices is associated with an eNB.

At step 1604, the eNB transmits downlink control information based on rate matching of at least one of the sets of parameters, the control information including EPDCCH resource elements in a coordinated multipoint system.

The references signals may include one or more of CSI-RS and CRS. Performing rate-matching using a plurality of sets of references signals may include determining a set of usable resources for transmitting the EPDCCH. Performing rate-matching using a plurality of sets of references signals may include rate-matching around all of the indices in the plurality of sets of indices. Performing rate-matching using a plurality of sets of references signals may include rate-matching around all nonzero-power indices in the plurality of sets of indices. Performing rate-matching using a plurality of sets of references signals may include rate-matching around a set of indices in the plurality of sets of indices that includes a minimum number of indices. Performing rate-matching using a plurality of sets of references signals may include rate-matching around a set of indices in the plurality of sets of indices that includes a maximum number of indices.

In some embodiments, a set of aggregation levels is determined based on the plurality of sets of indices. The set of aggregation levels may be determined independently of the rate-matching. Rate-matching may be performed around the CSI-RS using a set of parameters that is selected based on an aggregation level associated with the selected set of parameters. In some embodiments, one set of indices relates to CRS transmitted by a serving cell.

Figure 17:
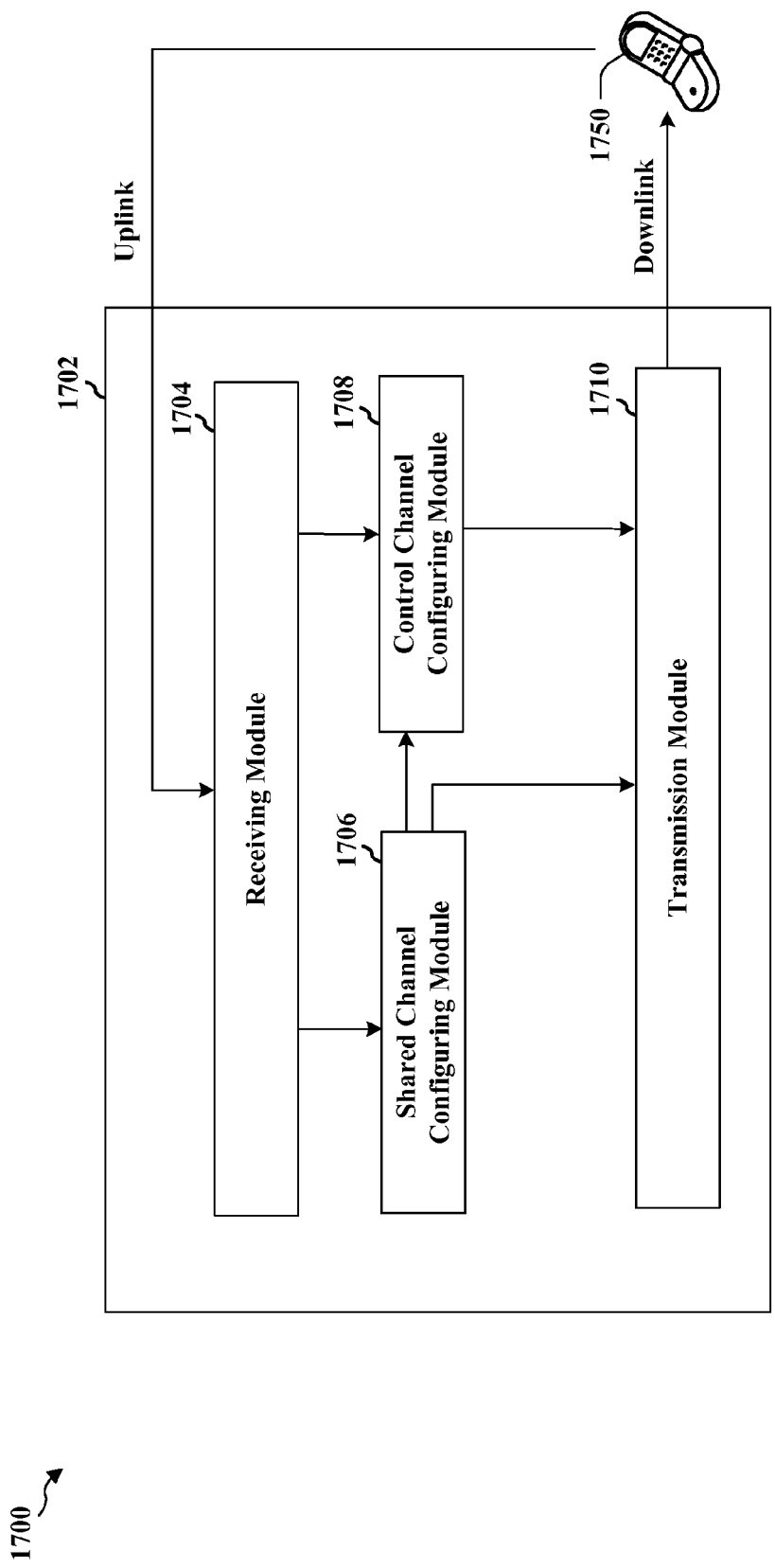
FIG. 17 is a conceptual data flow diagram illustrating the data flow between different modules/means/components in an exemplary apparatus.

FIG. 17 is a conceptual data flow diagram 1700 illustrating the data flow between different modules/means/components in an exemplary apparatus 1702. The apparatus may be an eNB. The apparatus includes a module 1704 that receives UL signals from a UE 1750, a module 1706 that configures a first set of configurations for a PDSCH, each configuration in the first set of configurations defining at least one of a starting symbol, rate-matching information, or a QCL indication, a module 1708 that configures at least a first resource set and a second resource set for a control channel, configures first rate-matching parameters for the first resource set and second rate-matching parameters for the second resource set, and configures a second set of configurations for an EPDCCH, the second set of configurations being a subset from among the first set of configurations, and a module 1710 that transmits the first set of configurations for the PDSCH and the second set of configurations for the EPDCCH, transmits the first rate-matching parameters and the second rate-matching parameters, transmits the control channel using the first resource set and the second resource set, and/or transmits the EPDCCH.

The apparatus may include additional modules that perform each of the steps of the algorithm in the aforementioned flow charts of FIGS. 14-16. As such, each step in the aforementioned flow charts of FIGS. 14-16 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 18:
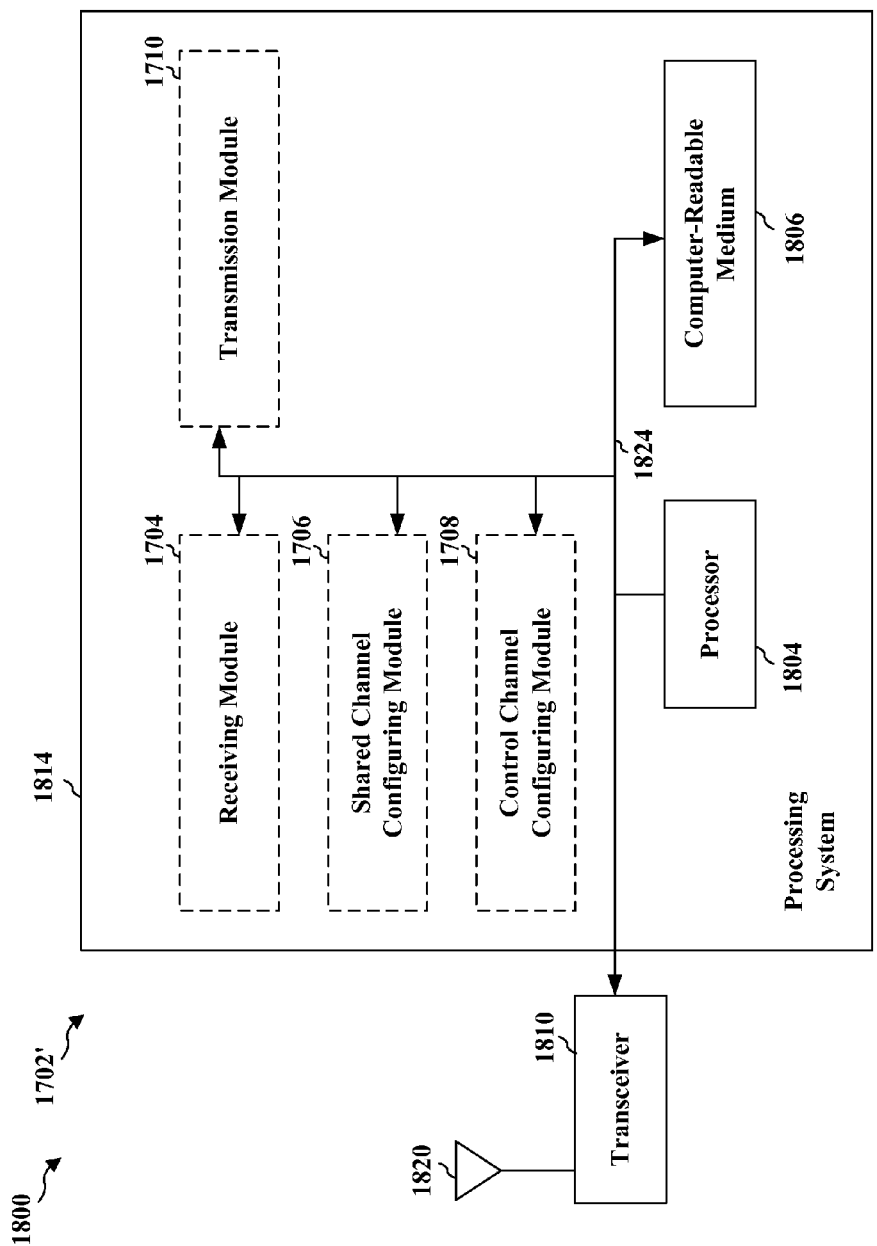
FIG. 18 is a diagram illustrating an example of a hardware implementation for an apparatus employing a processing system.

FIG. 18 is a diagram 1800 illustrating an example of a hardware implementation for an apparatus 1702' employing a processing system 1814. The processing system 1814 may be implemented with a bus architecture, represented generally by the bus 1824. The bus 1824 may include any number of interconnecting buses and bridges depending on the specific application of the processing system 1814 and the overall design constraints. The bus 1824 links together various circuits including one or more processors and/or hardware modules, represented by the processor 1804, the modules 1704, 1706, 1708, and 1710, and the computer-readable medium/memory 1806. The bus 1824 may also link various other circuits such as timing sources, peripherals, voltage regulators, and power management circuits, which are well known in the art, and therefore, will not be described any further.

The processing system 1814 may be coupled to a transceiver 1810. The transceiver 1810 is coupled to one or more antennas 1820. The transceiver 1810 provides a means for communicating with various other apparatus over a transmission medium. The transceiver 1810 receives a signal from the one or more antennas 1820, extracts information from the received signal, and provides the extracted information to the processing system 1814, specifically the receiving module 1704. In addition, the transceiver 1810 receives information from the processing system 1814, specifically the transmission module 1710, and based on the received information, generates a signal to be applied to the one or more antennas 1820. The processing system 1814 includes a processor 1804 coupled to a computer-readable medium/memory 1806. The processor 1804 is responsible for general processing, including the execution of software stored on the computer-readable medium/memory 1806. The software, when executed by the processor 1804, causes the processing system 1814 to perform the various functions described supra for any particular apparatus. The computer-readable medium/memory 1806 may also be used for storing data that is manipulated by the processor 1804 when executing software. The processing system further includes at least one of the modules 1704, 1706, 1708, and 1710. The modules may be software modules running in the processor 1804, resident/stored in the computer readable medium/memory 1806, one or more hardware modules coupled to the processor 1804, or some combination thereof. The processing system 1814 may be a component of the eNB 610 and may include the memory 676 and/or at least one of the TX processor 616, the RX processor 670, and the controller/processor 675.

In one configuration, the apparatus 1702/1702' for wireless communication includes means for configuring a first set of configurations for a PDSCH, each configuration in the first set of configurations defining at least one of a starting symbol, rate-matching information, or a QCL indication, means for configuring a second set of configurations for an EPDCCH, the second set of configurations being a subset from among the first set of configurations, means for transmitting the first set of configurations for the PDSCH and the second set of configurations for the EPDCCH, means for transmitting the EPDCCH, means for configuring at least a first resource set and a second resource set for a control channel, means for configuring first rate-matching parameters for the first resource set and second rate-matching parameters for the second resource set, means for transmitting the first rate-matching parameters and the second rate-matching parameters, means for transmitting the control channel using the first resource set and the second resource set. The aforementioned means may be one or more of the aforementioned modules of the apparatus 1702 and/or the processing system 1814 of the apparatus 1702' configured to perform the functions recited by the aforementioned means. As described supra, the processing system 1814 may include the TX Processor 616, the RX Processor 670, and the controller/processor 675. As such, in one configuration, the aforementioned means may be the TX Processor 616, the RX Processor 670, and the controller/processor 675 configured to perform the functions recited by the aforementioned means.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication at a user equipment (UE), comprising:
   receiving, at the UE, a downlink signal comprising one or more control channels;
   determining at the UE, based on an enhanced physical downlink control channel (EPDCCH) configuration, whether a starting symbol of an EPDCCH is transmitted in an initial symbol in a subframe; and
   refraining, at the UE, from decoding a subset of legacy control channels in the subframe when the starting symbol of the EPDCCH is transmitted in the initial symbol in the subframe.

2. The method of claim 1, wherein the refraining comprises refraining from decoding the subset of legacy control channels in the subframe when both the subframe does not include a downlink broadcast transmission and the starting symbol of the EPDCCH is the initial symbol in the subframe.

3. The method of claim 1, wherein the EPDCCH configuration identifies a first EPDCCH resource set and a second EPDCCH resource set, and wherein the refraining comprises refraining from decoding the subset of legacy control channels in the subframe when a starting symbol of the first EPDCCH resource set and a starting symbol of the second EPDCCH resource set both comprise the initial symbol in the subframe.

4. The method of claim 1, wherein the legacy control channels for which the subset is refrained from decoding comprise at least one of:
   a physical control format indicator channel (PCFICH),
   a physical hybrid-ARQ indicator channel (PHICH),
   or a combination thereof.

5. The method of claim 1, wherein the refraining includes refraining from decoding all legacy control channels in the subframe when the starting symbol of the EPDCCH is the initial symbol in the subframe.

6. An apparatus for wireless communication, comprising:
   means for receiving, at a user equipment (UE), a downlink signal comprising one or more control channels;
   means for determining at the UE, based on an enhanced physical downlink control channel (EPDCCH) configuration, whether a starting symbol of an EPDCCH is transmitted in an initial symbol in a subframe; and
   means for refraining, at the UE, from decoding a subset of legacy control channels in the subframe when the starting symbol of the EPDCCH is transmitted in the initial symbol in the subframe.

7. The apparatus of claim 6, wherein the means for refraining are configured to refrain from decoding the subset of legacy control channels in the subframe when both the subframe does not include a downlink broadcast transmission and the starting symbol of the EPDCCH is the initial symbol in the subframe.

8. The apparatus of claim 6, wherein the EPDCCH configuration identifies a first EPDCCH resource set and a second EPDCCH resource set, and wherein the means for refraining are configured to refrain from decoding the subset of legacy control channels in the subframe when a starting symbol of the first EPDCCH resource set and a starting symbol of the second EPDCCH resource set both comprise the initial symbol in the subframe.

9. The apparatus of claim 6, wherein the legacy control channels for which the subset is refrained from decoding comprise at least one of:
   a physical control format indicator channel (PCFICH),
   a physical hybrid-ARQ indicator channel (PHICH),
   or a combination thereof.

10. The apparatus of claim 6, wherein the means for refraining are configured to refrain from decoding all legacy control channels in the subframe when the starting symbol of the EPDCCH is the initial symbol in the subframe.

11. An apparatus for wireless communication, comprising:
    a memory; and
    at least one processor coupled to the memory and configured to:
      receive, at a user equipment (UE), a downlink signal comprising one or more control channels;
      determine, at the UE, based on an enhanced physical downlink control channel (EPDCCH) configuration, whether a starting symbol of an EPDCCH is transmitted in an initial symbol in a subframe; and
      refrain, at the UE, from decoding a subset of legacy control channels in the subframe when the starting symbol of the EPDCCH is transmitted in the initial symbol in the subframe.

12. The apparatus of claim 11, wherein the refraining comprises refraining from decoding the subset of legacy control channels in the subframe when both the subframe does not include a downlink broadcast transmission and the starting symbol of the EPDCCH is the initial symbol in the subframe.

13. The apparatus of claim 11, wherein the EPDCCH configuration identifies a first EPDCCH resource set and a second EPDCCH resource set, and wherein the refraining comprises refraining from decoding the subset of legacy control channels in the subframe when a starting symbol of the first EPDCCH resource set and a starting symbol of the second EPDCCH resource set both comprise the initial symbol in the subframe.

14. The apparatus of claim 11, wherein the legacy control channels for which the subset is refrained from decoding comprise at least one of:
a physical control format indicator channel (PCFICH),
a physical hybrid-ARQ indicator channel (PHICH),
or a combination thereof.

15. The apparatus of claim 11, wherein the processor is further configured to refrain from decoding all legacy control channels in the subframe when the starting symbol of the EPDCCH is the initial symbol in the subframe.

16. A non-transitory computer-readable medium storing computer executable code for wireless communication at a user equipment (UE), comprising code for:
receiving, at the UE, a downlink signal comprising one or more control channels;
determining at the UE, based on an enhanced physical downlink control channel (EPDCCH) configuration, whether a starting symbol of an EPDCCH is transmitted in an initial symbol in a subframe; and
refraining, at the UE, from decoding a subset of legacy control channels in the subframe when the starting symbol of the EPDCCH is transmitted in the initial symbol in the subframe.

17. The computer-readable medium of claim 16, wherein the refraining comprises refraining from decoding the subset of legacy control channels in the subframe when both the subframe does not include a downlink broadcast transmission and the starting symbol of the EPDCCH is the initial symbol in the subframe.

18. The computer-readable medium of claim 16, wherein the EPDCCH configuration identifies a first EPDCCH resource set and a second EPDCCH resource set, and wherein the refraining comprises refraining from decoding the subset of legacy control channels in the subframe when a starting symbol of the first EPDCCH resource set and a starting symbol of the second EPDCCH resource set both comprise the initial symbol in the subframe.

19. The computer-readable medium of claim 16, wherein the legacy control channels for which the subset is refrained from decoding comprise at least one of:
a physical control format indicator channel (PCFICH),
a physical hybrid-ARQ indicator channel (PHICH),
or a combination thereof.

20. The computer-readable medium of claim 16, further comprising code for refraining from decoding all legacy control channels in the subframe when the starting symbol of the EPDCCH is the initial symbol in the subframe.

* * * * *